United States Patent
Daiber et al.

(10) Patent No.: US 6,322,933 B1
(45) Date of Patent: *Nov. 27, 2001

(54) VOLUMETRIC TRACK DEFINITION FOR DATA STORAGE MEDIA USED TO RECORD DATA BY SELECTIVE ALTERATION OF A FORMAT HOLOGRAM

(75) Inventors: Andrew J. Daiber, Palo Alto; Robert R. McLeod, Morgan Hill; Tokuyuki Honda, Menlo Park, all of CA (US)

(73) Assignee: Siros Technologies, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/229,457

(22) Filed: Jan. 12, 1999

(51) Int. Cl.$^7$ .............................. G03H 1/26; G11B 7/00

(52) U.S. Cl. .................................. 430/2; 430/1; 430/945; 430/321; 430/394; 369/24; 359/103; 359/109

(58) Field of Search .......................... 430/320, 321, 430/945, 1, 2, 394; 358/25, 22, 24, 26; 369/103, 109; 769/125

(56) References Cited

U.S. PATENT DOCUMENTS

| | | | |
|---|---|---|---|
| 3,618,049 | 11/1971 | Amodei et al. | 340/173 |
| 3,632,869 | * 1/1972 | Bartollini et al. | 359/26 |
| 3,635,545 | * 1/1972 | VanKerkhove et al. | 369/103 |
| 3,704,929 | * 12/1972 | Sakaguchi et al. | 365/125 |

(List continued on next page.)

FOREIGN PATENT DOCUMENTS

| | | | |
|---|---|---|---|
| 42 08 328 A1 | 9/1993 | (DE) | |
| 195 34 501 A1 | 5/1996 | (DE) | G11B/7/007 |
| 03/068949A | 3/1991 | (JP) | G03F/7/029 |
| 07005796A | 1/1995 | (JP) | G03H/1/02 |
| 410102766A | 5/1998 | (JP) | C08G/59/68 |
| WO 97/13183 | 4/1997 | (WO) | G03F/7/00 |
| WO 97/44714 | 11/1997 | (WO) | G03H/1/02 |
| WO 99/26112 | 5/1999 | (WO) | G03F/7/00 |
| WO 99/39248 | 8/1999 | (WO) | G03H/1/12 |

OTHER PUBLICATIONS

Serdyuk, V. <., et al., "Structure of wave fields formed by 3–D vector holograms", Opt. Spectrosc (USSR), vol. 57(4), pp. 415–419, Oct. 1984.*

S. Homan, et al, "High–Capacity Optical Storage Using Multiple Wavelengths, Multiple Layers and Volume Holograms", Electronics Letters, 13$^{th}$ Apr. 1995, vol. 31 No. 8, pp. 621–623.

H.J. Eichler, et al. "Multiplexed Holograms for the Microholographic Storage Disc" Technical Digest,IEEE/Laser and Electro–Optics Society, vol. 8, May 10–13, 1998 pp. 77–79.

H.J. Eichler, et al. "High Density Disc Storage by Multiplexed Microholograms" SPIE vol. 3109, Optical Data Storage 97, IEEE/Laser and Electro–Optics Society, pp. 239–244.

(List continued on next page.)

*Primary Examiner*—Martin Angebranndt
(74) *Attorney, Agent, or Firm*—Sierra Patent Group, Ltd.; Andrew V. Smith

(57) ABSTRACT

A photoactive medium has a complex format grating written thereon, the complex format grating including at least three component gratings, each of the component gratings characterized by a unique grating vector. Methods for writing the complex format grating include the steps of providing a photoactive medium; and focussing a plurality of pairs of mutually coherent light beams into a focal plane in the medium.

13 Claims, 38 Drawing Sheets

U.S. PATENT DOCUMENTS

| | | | |
|---|---|---|---|
| 3,720,921 | * 3/1973 | Schools et al. | 365/125 |
| 3,860,950 | * 1/1975 | Wick et al. | 359/26 |
| 3,903,360 | * 9/1975 | Kamisaka et al. | 369/103 |
| 3,947,640 | 3/1976 | Ruell et al. | 179/100.3 B |
| 4,024,513 | 5/1977 | Huignard et al. | 340/173 LT |
| 4,045,115 | 8/1977 | Lee | 350/3.5 |
| 4,058,401 | 11/1977 | Crivello | 96/115 R |
| 4,138,189 | 2/1979 | Huignard et al. | 350/3.64 |
| 4,183,094 | 1/1980 | Keezer et al. | 365/127 |
| 4,187,111 | 2/1980 | Chandross et al. | 430/2 |
| 4,318,581 | 3/1982 | Guest et al. | 350/3.74 |
| 4,458,345 | * 7/1984 | Bjorklund et al. | 369/103 |
| 4,467,462 | 8/1984 | Shibata | 369/45 |
| 4,775,968 | 10/1988 | Ohsato | 369/46 |
| 4,859,548 | * 8/1989 | Heise et al. | 430/394 |
| 4,920,220 | 4/1990 | Phaff | 544/90 |
| 4,924,455 | 5/1990 | Fujiie et al. | 369/44.21 |
| 4,999,234 | * 3/1991 | Cowan | 430/1 |
| 5,157,555 | 10/1992 | Reno | 359/823 |
| 5,161,039 | 11/1992 | Schellenberg | 359/3 |
| 5,191,574 | 3/1993 | Henshaw et al. | 369/100 |
| 5,202,875 | 4/1993 | Rosen et al. | 369/94 |
| 5,242,715 | 9/1993 | Schoen et al. | 427/386 |
| 5,243,589 | 9/1993 | Stuke et al. | 369/100 |
| 5,263,011 | 11/1993 | Maeda et al. | 369/44.27 |
| 5,283,777 | 2/1994 | Tanno et al. | 369/108 |
| 5,289,407 | 2/1994 | Strickler et al. | 369/106 |
| 5,331,445 | 7/1994 | Dickson et al. | 359/15 |
| 5,361,238 | * 11/1994 | Owechko | 365/125 |
| 5,408,453 | 4/1995 | Holtslag et al. | 369/44.23 |
| 5,415,835 | * 5/1995 | Brueck et al. | 430/394 |
| 5,422,873 | 6/1995 | Kewitsch et al. | 369/103 |
| 5,430,701 | 7/1995 | Ito et al. | 369/44.41 |
| 5,440,669 | 8/1995 | Rakuljic et al. | 359/7 |
| 5,450,218 | 9/1995 | Heanue et al. | 359/21 |
| 5,453,340 | 9/1995 | Kawabata et al. | 430/2 |
| 5,477,347 | 12/1995 | Redfield | 369/3 |
| 5,479,394 | 12/1995 | Yashima et al. | 369/275.1 |
| 5,499,231 | 3/1996 | Fennema et al. | 369/124 |
| 5,513,158 | 4/1996 | Ohsato | 369/44.23 |
| 5,526,336 | 6/1996 | Park et al. | 369/94 |
| 5,529,862 | 6/1996 | Redfield | 430/1 |
| 5,559,773 | 9/1996 | Kantatsu et al. | 369/44.42 |
| 5,566,387 | * 10/1996 | Dewald | 369/103 |
| 5,590,110 | 12/1996 | Sato | 369/100 |
| 5,610,895 | 3/1997 | Izumi et al. | 369/112 |
| 5,627,814 | 5/1997 | Lee | 369/116 |
| 5,636,190 | 6/1997 | Choi | 369/44.23 |
| 5,639,579 | 6/1997 | Hayashi et al. | 430/7 |
| 5,659,536 | 8/1997 | Maillot et al. | 369/275.1 |
| 5,671,207 | 9/1997 | Park | 369/112 |
| 5,682,372 | 10/1997 | Yamakawa et al. | 369/94 |
| 5,691,971 | 11/1997 | Kim | 369/112 |
| 5,696,743 | 12/1997 | Kawasaki | 369/32 |
| 5,698,345 | 12/1997 | Ohe et al. | 430/2 |
| 5,701,288 | 12/1997 | Seong | 369/112 |
| 5,702,846 | 12/1997 | Sato et al. | 430/2 |
| 5,712,730 | * 1/1998 | Zarschitzky et al. | 359/558 |
| 5,729,522 | 3/1998 | Akama et al. | 369/112 |
| 5,737,294 | 4/1998 | Yamakawa et al. | 369/99 |
| 5,737,295 | 4/1998 | Lee | 369/103 |
| 5,740,136 | 4/1998 | Tsutsui et al. | 369/44.25 |
| 5,748,597 | 5/1998 | Kim | 369/94 |
| 5,754,512 | 5/1998 | Komma et al. | 369/112 |
| 5,757,744 | 5/1998 | Akkermans | 369/44.25 |
| 5,759,721 | 6/1998 | Dhal et al. | 430/1 |
| 5,761,111 | 6/1998 | Glezer | 365/106 |
| 5,764,606 | 6/1998 | Fukumoto et al. | 369/44.41 |
| 5,768,242 | 6/1998 | Juday | 369/103 |
| 5,776,634 | 7/1998 | Ohkuma et al. | 430/2 |
| 5,786,117 | 7/1998 | Hoshi et al. | 430/21 |
| 5,790,493 | 8/1998 | Takeya et al. | 369/58 |
| 5,793,720 | 8/1998 | Nishikata | 369/44.25 |
| 5,793,721 | 8/1998 | Akkermans | 369/44.27 |
| 5,811,789 | 9/1998 | Nix | 250/201.2 |
| 5,822,090 | 10/1998 | Wilde | 359/7 |
| 5,966,361 | * 10/1999 | Stoll | 369/103 |
| 5,982,513 | 11/1999 | Zhou et al. | 359/22 |
| 6,020,985 | * 2/2000 | McLeod et al. | 359/22 |
| 6,045,888 | 4/2000 | Chen et al. | 428/64.1 |
| 6,111,828 | 8/2000 | McLeod et al. | 369/44.23 |

OTHER PUBLICATIONS

Yoshimasa Kawata, et al., "Three–dimensional Optical Memory with a Photorefractive Crystal" 1995 Optical Society of America, Jul. 10, 1995, vol. 34, No. 20. Applied Optics, pp. 4105–4110.

Yoshimasa Kawata, et al., "Randomly Accessible, Multilayered Optical Mamory with a Bi 12SIO20 Crystal" Applied Optics, vol. 35, No. Sep. 1996, pp. 5308–5311.

Fleisher et al. "An Optically Acessed Memory Using the Lippmann Porcess . . ."Opt & Electro–Optical Information Processing.

Parthenopoulos et al, "Three Dimensional Optical Storage Memory", Science vol. 245 Aug. 1989 pp. 843–845 Chap. 1 pp. 1–30 (1985).

Kawata et al., "Photopolymer System and its Application to a Color Hologram," *Applied Optics*, vol. 33 No. 11, pp. 2152–2156, Reprinted: *Optical Society of America*, 1994, pp. 147–151.

Perry et al., "Enhanced Reverse Saturable Absorption and Optical Limiting in Heavy–Atom Substitued Phthalocyanines," a reprint from *Optics Letters, Jet Propulsion Laboratory, California Institute of Technology*, May 1, 1994, vol. 19, No. 9, pp. 625–627.

Kardinahl et al., "Photoinduced Refractive–Index Changes in Fulgide–Doped PMMA Films," *Applied Physics A: Materials Science and Processing*, 1995, vol. 61, No. 1, Abstract Only.

Waldman et al., "Cationic Ring–Opening Photopolymerization Methods for Volume Hologram Recording," *SPIE*, 1996, vol. 2689, No. 26, pp. 127–141.

Perry et al., "Organic Optical Limiter with a Strong Nonlinear Absorptive Response," Science, Sep. 13, 1996, vol. 273, pp. 1533–1536, a reprint series from: 1996 by the American Association for the Advancement of Science.

Glezer et al., "Three–Dimensional Optical Storage Inside Transparent Materials," *Optics Letters*, Dec. 16, 1996, vol. 21, No. 24, pp. 2023–2025.

Waldman et al., "Determination of Low Transverse Shrinkage in Slant Fringe Gratings of a Cationic Ring–Opening Volume Hologram Recording Material," *SPIE,*1997, vol. 3010, pp. 354–372.

Nalwa et al., "Nonlinear Optics of Organic Molecules and Polymers," *CRC Press, Inc.*, 1997, pp. 813–840.

Diez et al., "High Density Disc Storage by Multiplexed Microholograms," *Cleo 97*, 1997, pp. 258–259.

Elrich et al., "Two–Photo Absorption and Broadland Optical Limiting with Bis–Donor Stilbenes," *Optics Letters*, Dec. 15, 1997, vol. 22, No. 24, pp. 1843–1845.

Waldman et al., "Holographic Recording Properties in Thick Films of ULSH–500 Photopolymer," *SPIE*, 1998, vol. 3291, pp. 89–103.

Khairutdinov et al., "Photochromism of Spirooxazines in Homogenous Solution and Phospholipid Liposomes," *Journal of the American Chemical Society*, Dec. 16, 1998, vol. 120, No. 49, pp. 12707–12713.

Eichler et al., "Holographic Recording of Microscopic Bragg–Reflectors for Optical Storage," *SPIE*, 1998, vol. 3401, pp. 118–127.

Cumpston et al., "Two–Photon Polymerization Initiators for Three–Dimensional Optical Data Storage and Microfabrication," *Nature*, Mar. 1999, pp. 51–54.

Loy et al., "Cyclization Phenomena in the Sol–Gel Polymerization of a, w–Bis (triethoxysily) Alkanes and Incorporation of the Cyclic Structures into Network Silsesquioxane Polymers," *Journal of the American Chemistry Society*, 1999, vol. 121, pp. 5413–5425.

H.J. Eichler, "Wavelength Multiplexing for the Microholographic Storage Disc," *SPIE*, 1998, vol. 3401, pp. 177–186.

Albota et al., "Design of Organic Molecules with Large Two–Photon Absorption Cross Sections," Sep. 11, 1998, vol. 281.

J. Eickmans et al., "Photoaddressable Polymers: A New Class of Materials for Optical Data Storage and Holographic Memories," 1999, pp. 184–185.

* cited by examiner

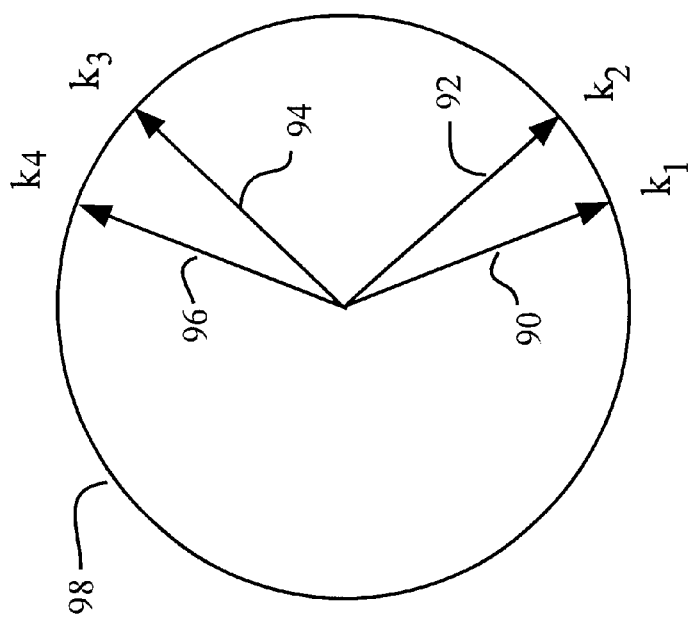
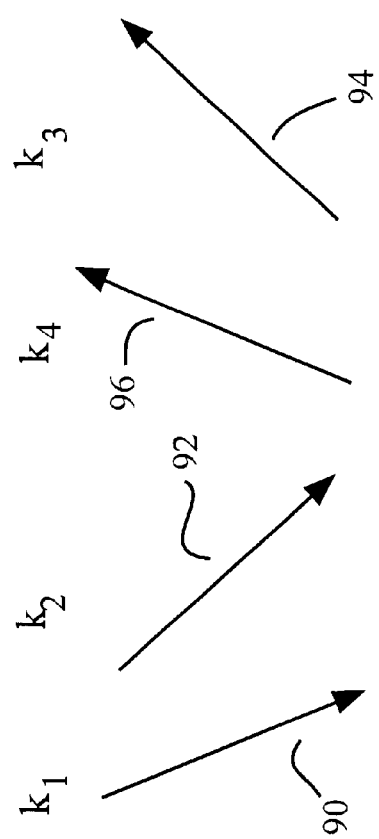
Fig. 8B
Fig. 8A

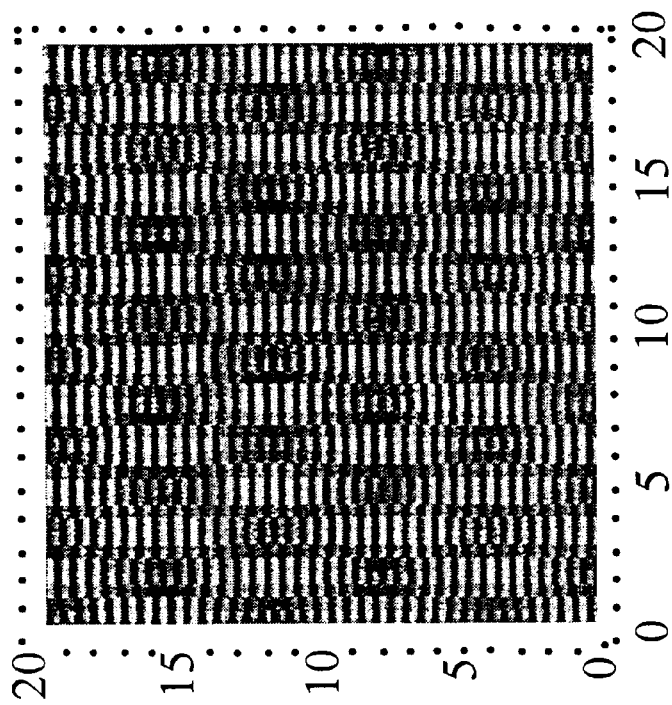
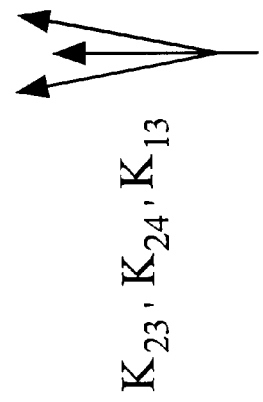
Fig. 19C
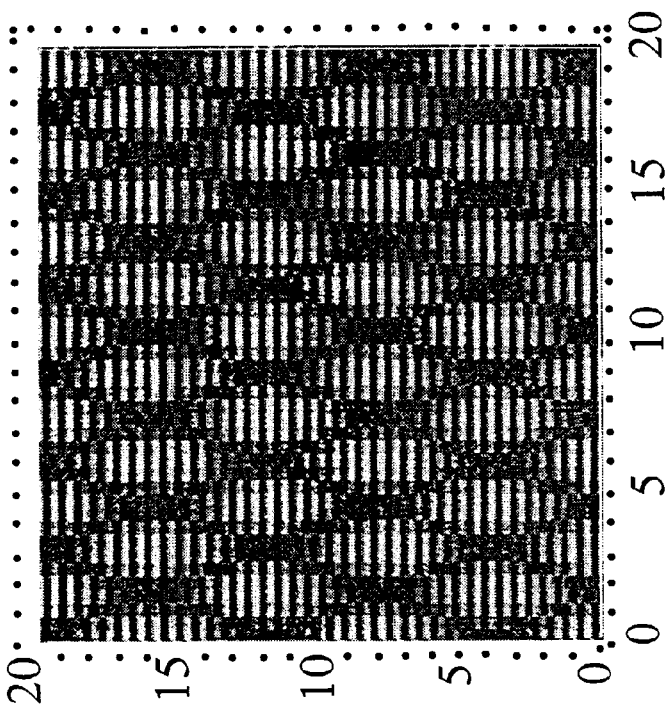
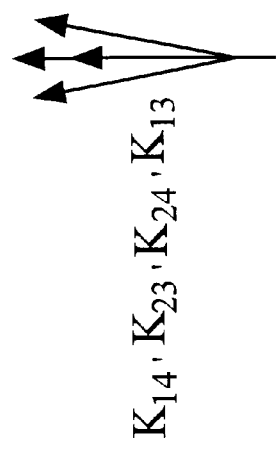
Fig. 19B

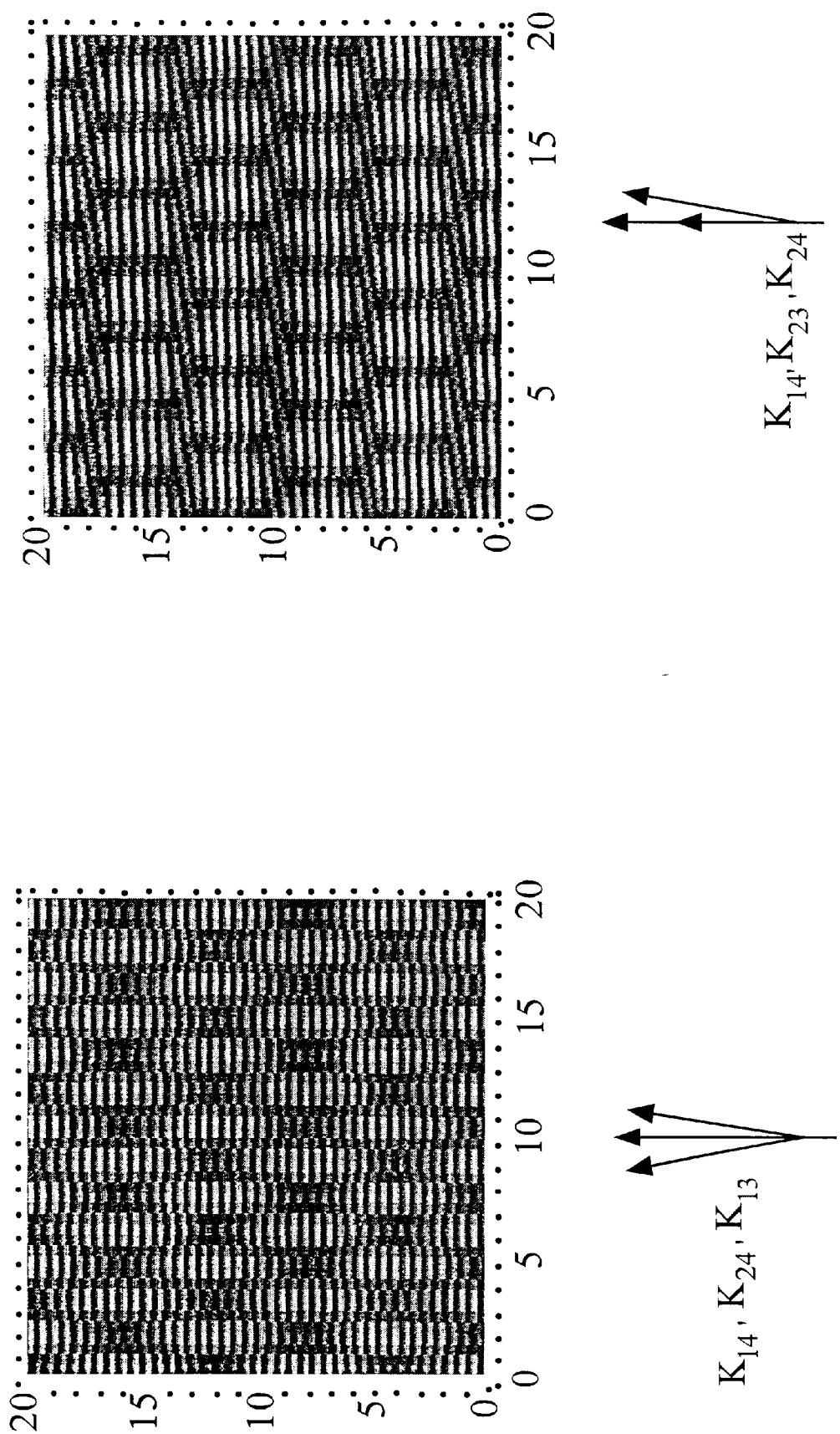

$K_{24}, K_{13}$

VOLUMETRIC TRACK DEFINITION FOR DATA STORAGE MEDIA USED TO RECORD DATA BY SELECTIVE ALTERATION OF A FORMAT HOLOGRAM

BACKGROUND OF THE INVENTION

1. Field of the Invention

The present invention relates to storage devices comprising bulk monolithic materials including formatted multiple optical data regions, such as data layers and/or tracks, and methods for forming such optical data regions, data layers and/or tracks in such materials.

2. The Prior Art

In conventional holographic storage, data is stored as holograms resulting from the interference of a signal and reference beam. During storage, both the reference and signal beams are incident on the storage medium. During retrieval, only the reference beam is incident on the medium. The reference beam interacts with a stored hologram, generating a reconstructed signal beam proportional to the original signal beam used to store the hologram.

For information on conventional volume holographic storage see for example U.S. Pat. Nos. 4,920,220, 5,450,218, and 5,440,669. In conventional volume holographic storage, each bit is stored as a hologram extending over a substantial volume of the storage medium. Multiple bits are encoded and decoded together in pages, or two-dimensional arrays of bits. Multiple pages can be stored within the volume by angular, wavelength, phase-code, or related multiplexing techniques. Each page can be independently retrieved using its corresponding reference beam. The parallel nature of the storage approach allows high transfer rates and short access times, since as many as $10^6$ bits within one page can be stored and retrieved simultaneously.

Conventional page-based volume holographic storage generally requires complex, specialized components such as amplitude and/or phase spatial light modulators. Moreover, ensuring that the reference and signal beams are mutually coherent over the entire volume of the storage medium generally requires a light source with a relatively high coherence length, as well as a relatively stable mechanical system. Mechanical stability and coherence-length requirements have hindered the development of inexpensive, stable, and rugged holographic storage devices capable of convenient operation in a typical user environment.

In U.S. Pat. No. 4,458,345, Bjorklund et al. describe a bit-wise volume holographic storage method using signal and reference beams incident on a rotating disk in a transmission geometry. The signal and reference beams are incident from the same side of the disk. The angle between the reference and signal beams can be altered to store holograms at various depths within the medium. A separate photodetector is used to retrieve data stored at each depth. The interaction of light with the medium is localized through two-photon recording.

In U.S. Pat. No. 5,659,536, Maillot et al. describe a system in which multiple holograms are stored at each location in a disk through wavelength multiplexing. Each hologram spans the depth of the medium. In U.S. Pat. No. 5,289,407, Strickler et al. describe a multi-layered, non-holographic, index-perturbation optical storage system. Bits are stored as localized perturbations in the index of refraction of a photopolymer, caused by the high intensity at the focus of a single laser beam.

BRIEF DESCRIPTION OF THE INVENTION

Co-pending Ser. No. 09/016,382, filed Jan. 30, 1998, discloses the recording an elementary format grating having one grating vector representing its fringe periodicity, and the recording of a compound format grating, in which two gratings having two different spatial frequencies are superimposed to define different data layers in a bulk, monolithic medium. The present invention employs more complex formatting structures and methods, thus providing for improved data storage.

Briefly, and in general terms, the present invention provides a storage device comprising a photoactive storage medium formatted with a complex format grating hologram to provide multiple data regions, data layers and/or tracks, and to methods for defining such data layers and/or tracks, in such a photoactive storage medium. The storage medium is preferably, but not necessarily, a bulk, monolithic material. The methods of the present invention can be used to record a complex format hologram to define tracks and/or layers for volumetric data storage.

Volumetric storage includes direct recording of data by introducing a volumetric bit as an index or absorption change at spatial locations in a photoactive storage medium. Volumetric storage also includes storage by selective alteration of a format hologram. The present invention provides a method for generating complex format holograms comprising several component gratings, each of which may be characterized by a separate spatial frequency and which can be further configured to define tracks. Data can then be recorded along the tracks. Each component grating is formed by focussing a pair of mutually coherent light beams into the medium.

Data layer and/or track definition in a photoactive medium using a complex format grating according to the present invention can be accomplished by superimposing several holograms so that the nulls resulting from their beating define the boundaries of data layers and/or tracks. The tracks can take several forms, including, without limitation, concentric tracks for use in disk-oriented storage devices and linear volumes defining tracks for use in card- and tape-oriented storage devices. The complex format grating can be configured to define tracks throughout the volume of the material. Tracks stored throughout the volume can be used, for example, to define data layers. In one embodiment, the tracks take the form of concentric generally-toroidal volumes in each layer. The words "tubes" and "tracks" will both be used herein to refer to these linear and toroidal volumes. In one embodiment, the tubes are disposed in an alternately offset arrangement from layer to layer, providing a closely-packed track structure.

According to one aspect of the present invention, a storage device is provided in which the multiple tracks have been defined by formatting according to the methods of the present invention. In one embodiment of the storage device according to the present invention, the tracks are defined in such a manner that strong fringe contrast of the complex format gratings occurs inside the track and weaker fringe contrast occurs at the borders of the track. Generally, when a confocal detector is used for data readout, a focussed readout beam Bragg-matched to a format grating and incident on the center of the track is more strongly reflected than a focussed readout beam Bragg-matched to the format grating and incident on the edge of the track. Such a confocal detector is described in co-pending application Ser. No. 09/016,382 filed Jan. 30, 1998

According to another aspect of the present invention, a system and method are provided for recording and reading data in a device in which a complex format grating has been configured to define multiple tubes or tracks. Data can be recorded, for example, by focussing a recording beam on the center of a track and modulating that beam as the medium moves past the recording beam. The recorded data can be read, for example, by focussing a reading beam on the center of a track and detecting the modulation of the reflected beam as the medium moves past the recording beam.

During recording and readout, a focussed Bragg-matched beam can be used to monitor the relative positions of the beam focus and the center of the track volume. During recording, this beam can be either the same beam as the recording beam or a separate beam superimposed on the recording beam. Monitoring the reflected signal using a detection bandwidth that averages a substantial number signal modulation events allows measurement of an average reflected signal whose strength depends on the position of the beam focus with respect to the center of the track volume.

A formatting method according to the present invention provides the feature of modulating the reflectivity of the medium transversely as well as in depth. This method defines multiple tubes or tracks within a modulated media for storing data, and can be used to define features for servoing mechanical read/write components to these tracks.

One embodiment of a method for writing these tracks or tubes on a photosensitive medium in the form of a disk consists of illuminating a photosensitive medium with mutually coherent laser beams focused to a common line focus where the line forms a radius of the disk, wherein the laser beams travel through the depth of the disk and reflect from a mirror. In this embodiment, four beams are incident on the photoactive medium, two on each side. The beams write four primary reflection grating components that create a modulated pattern strip. Depending on the manner in which the beams interact, which depends on their polarizations and the timing of exposure of beam pairs corresponding to separate component gratings (i.e., simultaneously or sequential exposure of beam pairs) up to two component transmission gratings may also be recorded. The disk is then rotated one revolution with precision equipment to wrap the pattern around the disk. This method has the advantage of always producing tracks concentric about the center of rotation. The tracks may then be written to and read from with a confocal detection channel. This channel may also be used to detect data along the tracks. Furthermore, the channel may be periodically swept in depth and/or radius to produce a signal for a feedback loop that mechanically locks the detection channel in a nominal position over a specific track.

According to another aspect of the present invention, the modulated reflection tracks may be written as linear tubes to define regions for data storage or servo control in parallelpiped "cards" or tapes. These cards can be written with mutually coherent plane waves that overlap the card and completely illuminate the surface of the card.

According to the present invention, a modulated complex format grating may be written with three or more component reflection gratings. In general, a variety of beam arrangements are possible and, after review of the present disclosure, would readily suggest themselves to a skilled artisan. In one embodiment, four grating components can be used in order to take advantage of a symmetric configuration of beam used to record holograms.

More generally, n gratings may be written using n pairs of mutually coherent beams according to the present invention, each pair of beams being responsible for the formation of a single grating. In some embodiments, the beam pairs do not interact; this separation of beam interaction can be achieved through the use e.g. of incoherent pairs of mutually coherent laser beams. In some embodiments, tubes are generated by three pairs of beams that illuminate the media, which correspond respectively to three reflection gratings. In one embodiment, three reflection gratings may be recorded using four beams using an arrangement in which the beam pairs that corresponding to each of the gratings share one of the four beams in common. The common beam is passed through the photoactive media in a direction opposite that of the other three beams. One method to generate the three return beams is to use a surface grating. In an extension of this technique, the surface grating absorbs or otherwise attenuates the return beams to diminish the transmission gratings written between these beams in the media with respect to the less attenuated reflection holograms written between the common beam and the three return beams. The surface grating "master" may have a Cartesian geometry, as appropriate for a card; a concentric pattern or a spiral pattern, as appropriate for a disk. In one embodiment the surface grating master is illuminated along a strip (orthogonal to the constant phase contours of the master) and the media is moved through the strip. In another embodiment, the surface grating master is as large as the card, disk or tape to be formatted, and illuminated at normal with a plane wave sufficient in size to illuminate the entire area of the photoactive medium to be formatted.

According to the present invention, the complex format gratings may be written into a stationary disk using an optical system having radial symmetry about the axis of the disk and a laser beam pointing down this axis. Such optical systems usually employ conical beams. In alternative embodiments the optical system may be generated from a strip geometry recording system which has the laser beam arranged to point along the disk axis by rotating the optical system design about the axis to produce a "solid model" for the optics. The complex format gratings of the present invention may also be written into a stationary medium using a volume holographic master instead of a surface holographic master.

In the case of data recording by selective alterations of a format grating, which is described in co-pending application Ser. No. 09/016,382, filed Jan. 30, 1998, the modulation of that format grating has several advantages for the recording of that data. Specifically, the invention provides a complex format grating for which the period between the nulls of adjacent tracks can be comparable to or less than the width of a recorded data mark, therefore serving to isolate more efficiently tracks with recorded data because the amplitude of a reflected signal is substantially lower at the nulls between tracks then at track centers. Thus, cross-talk between adjacent tracks is reduced, allowing increased signal-to-noise ratio or greater track density at the same signal-to-noise ratio, and descreased sensitivity due to mis-registration during recording, due to the presence of the low-reflectivity low-sensitivity guard-band between tracks.

The present invention may also be used to record large amounts of substantially periodic data simultaneously in the surface and/or in the depth of the material. The invention may also be used to generate servo or other useful signals that are essentially periodic, such as track wobble.

BRIEF DESCRIPTION OF THE DRAWING FIGURES

FIGS. 8A through 8E are diagrams showing the wave vectors of the incident light beams and the resulting grating vectors for the embodiment of FIG. 7.

FIGS. 19A through 19H are diagrams showing the constituent grating vectors corresponding to various combinations of the grating wave vectors $k_1$, $k_2$, $k_3$, and $k_4$ of FIG. 8A.

Figure 23A:
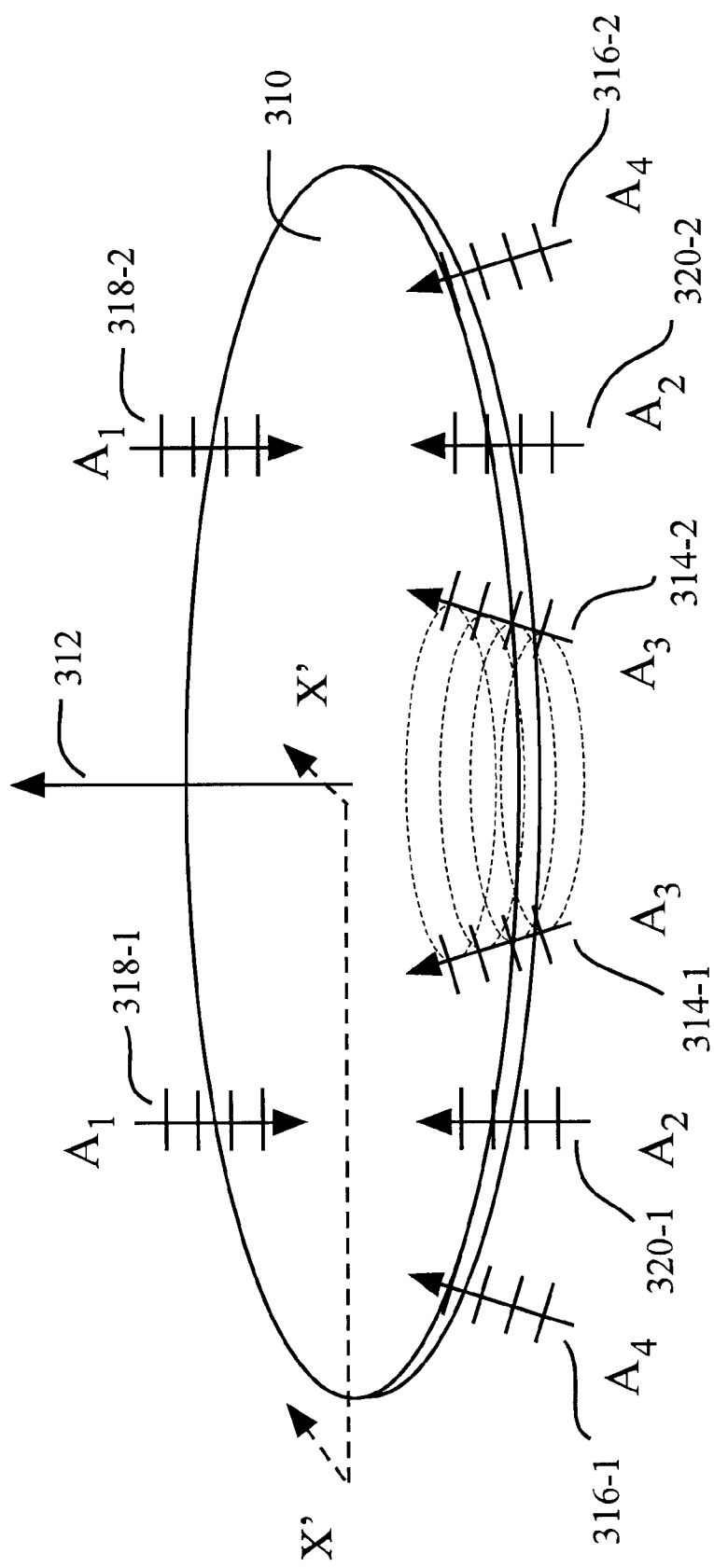
FIG. 23A is a diagram illustrating a perspective view of a rotatable media in the form of a disk and shows the use of four conical beams, one from above and three from below, to write a format hologram on a radial medium such as a disk.
Figure 23B:
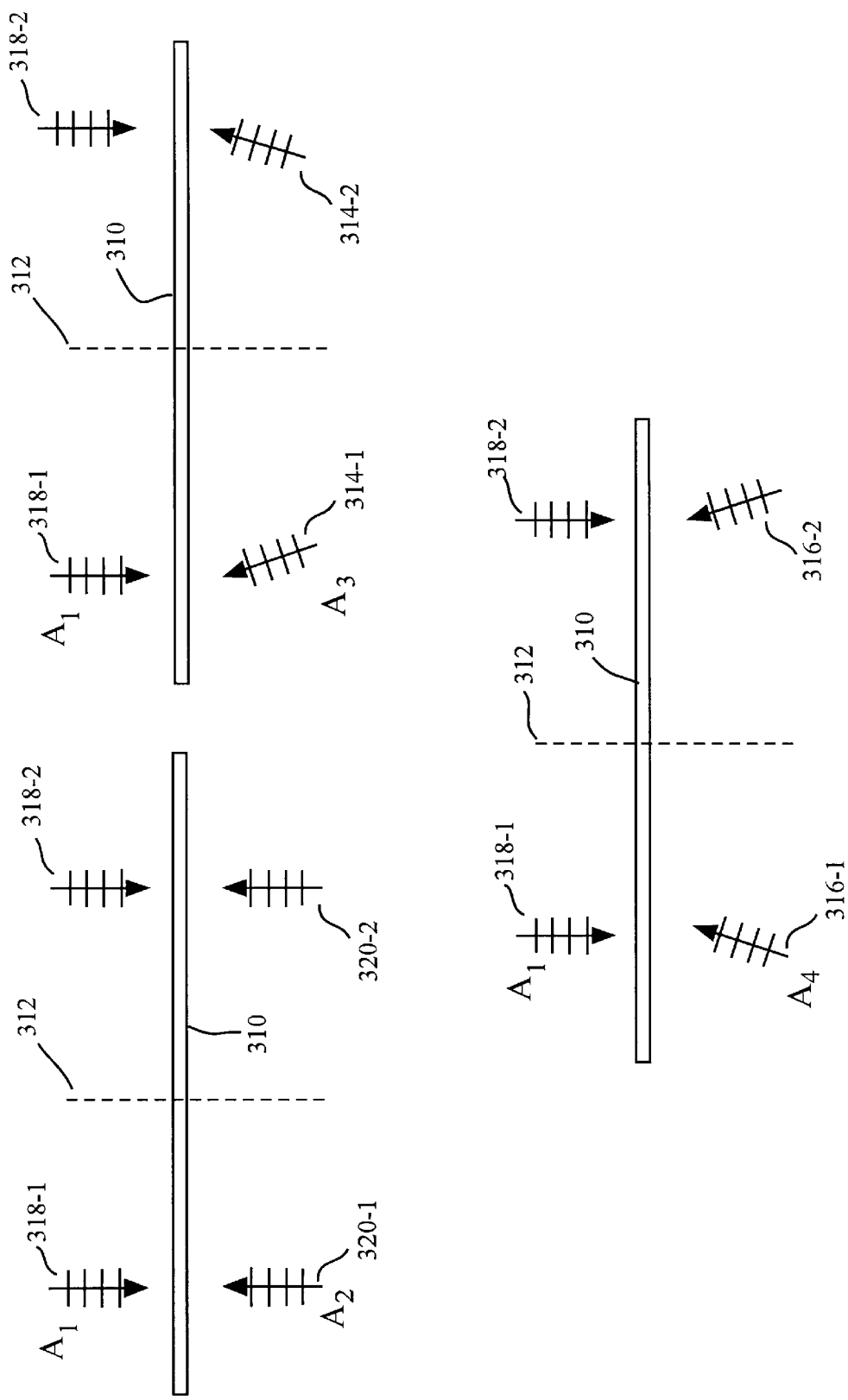

FIG. 23B comprises three cross-sectional views of the disk medium of FIG. 23A across a diameter thereof and shows the beam pairs used to write the complex format grating thereon.

Figure 24A:
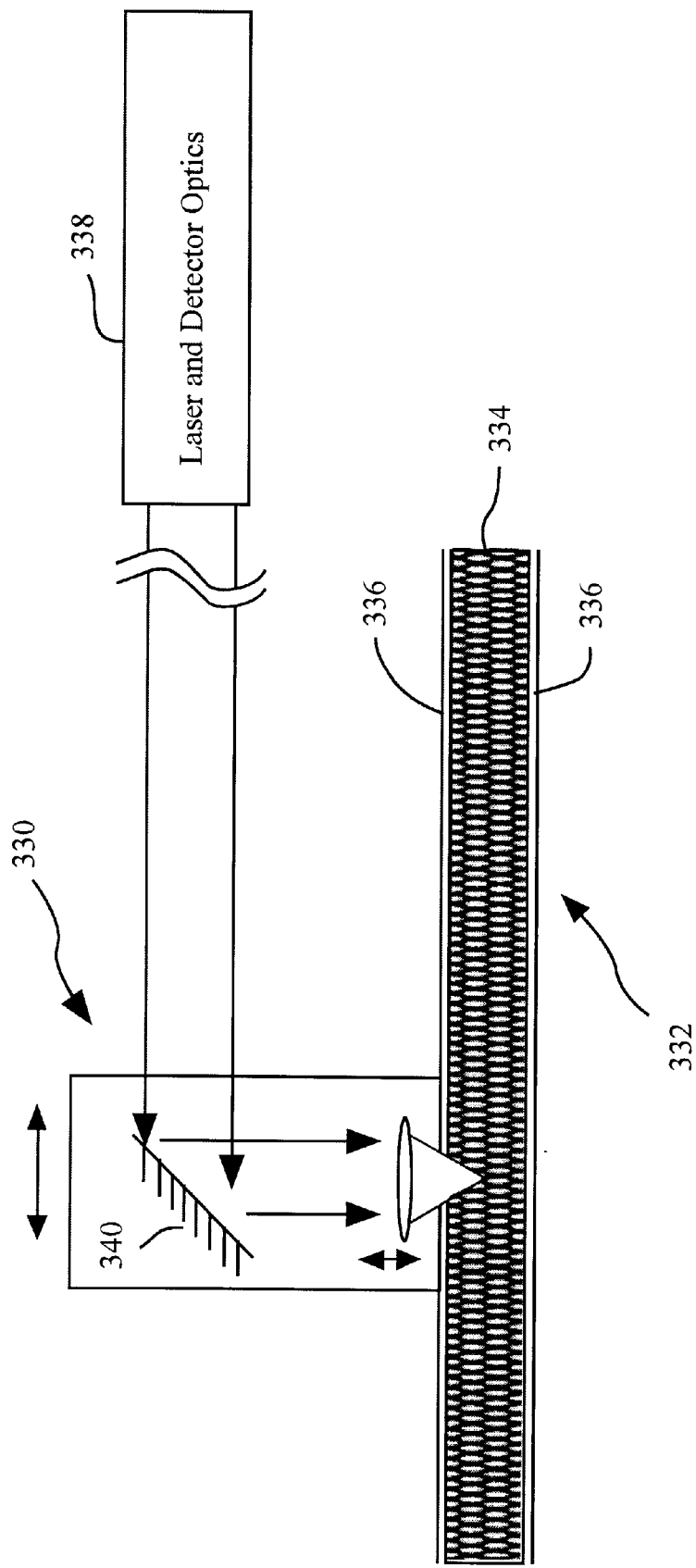

FIG. 24A is a diagram illustrating the use of an optical head articulatable in the horizontal and vertical directions to read from a photoactive medium formatted with a complex format grating according to the present invention.

Figure 24B:
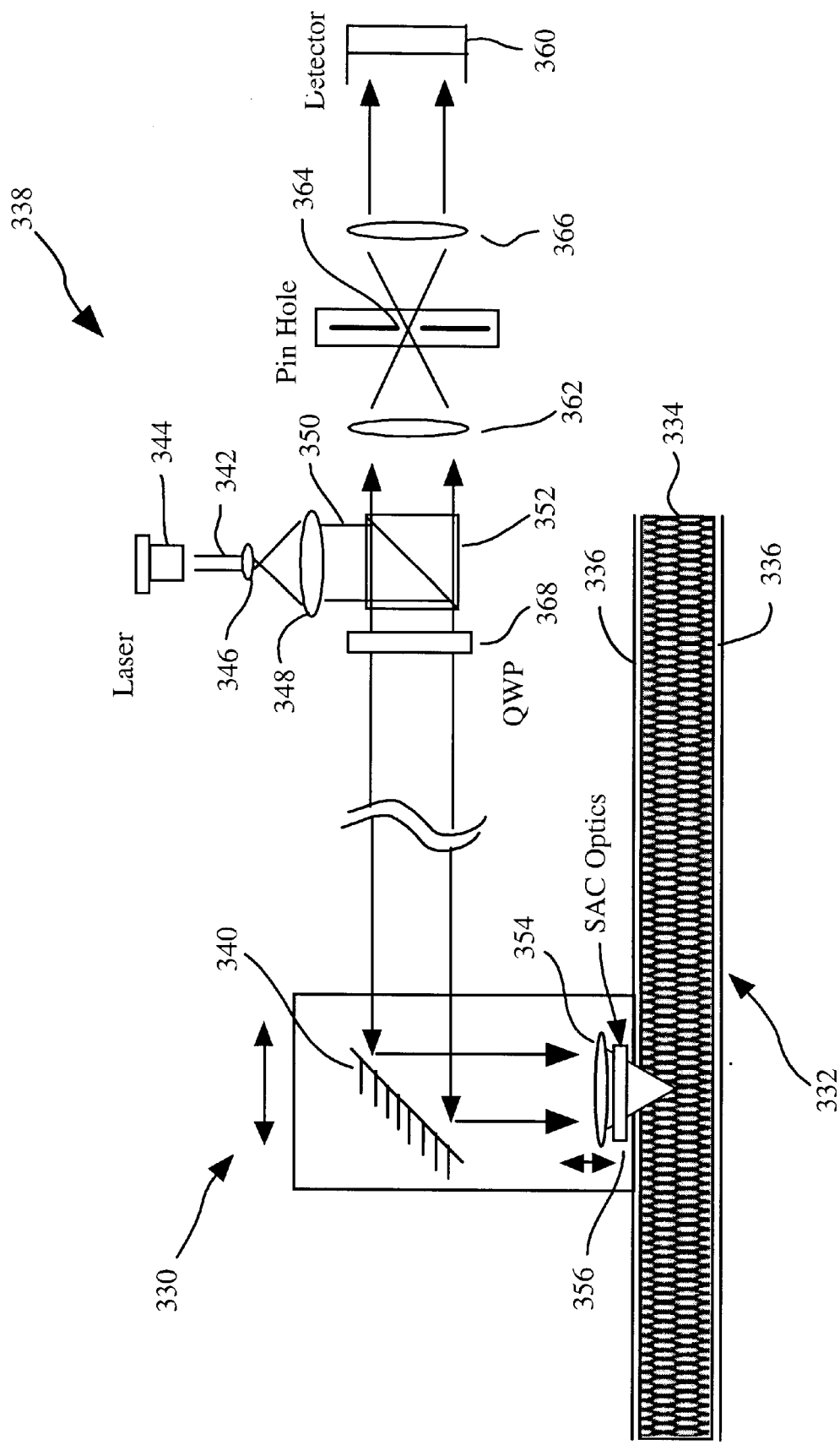

FIG. 24B is a diagram illustrating the use of an optical head articulatable in the horizontal and vertical directions to read from a photoactive medium formatted with a complex format grating according to the present invention, further showing the details of a confocal filter.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention provides methods for defining multiple tracks in photoactive media in volumetric storage systems, such as data recording by selective alterations of a format grating in the photoactive medium. Track structures as disclosed herein may also be used to generate servo signals to keep a data readout beam focussed on a selected data track in three dimensions. The present invention also provides a method for defining master gratings to generate format gratings. The present invention provides a method to write tracks simultaneously. The present invention also includes storage media formatted according to the present invention.

The tracks written using the inventions disclosed here are arranged in advantageous volume packing structures. These packings increase storage density, and reduce seek time. In some embodiments, the tracks are arranged into layers and the layers are situated such that tracks lie directly above or below other tracks. This regular arrangement simplifies seek operations between data on different layers. In addition, every other layer is shifted by half a track period into a hexagonal closest packed structures. This arrangement reduces crosstalk between tracks which may be exchanged in an engineering tradeoff for increase storage density.

The present invention is described with particular reference to bulk monolithic photoactive media. As used herein, the term "bulk monolithic photoactive media" refers to media formed from a homogeneous photoactive material in the bulk of which a plurality of continuous data storage regions may be disposed. The concepts of the present invention are also operative with multiple layer media in which discrete regions of photoactive material are arranged in layers so long as at least one layer is thick enough to support the format hologram volume produced by the present invention.

The format gratings of the present invention consist primarily of multiple, discrete spatial frequencies of index and/or absorption modulation disposed within a photoactive media. These gratings lead to a three-dimensional system of tubes or tracks in the media. This physical structure will be described. In practice, the writing system must also be considered, and, if the tracks are to be imaged onto a detector, the readout system must also be considered. A general writing method for writing general grating structures is described which is capable of writing almost any set of gratings.

In addition to a general writing method, specific writing system embodiments are described. These specific writing systems have added constraints imposed. For example, different writing methods produce different grating patterns with different component gratings, which are advantageous under different circumstances. A given writing method may also produce additional gratings that do not necessarily impact the advantages and/or disadvantages of the system exclusive of writing.

The readout system determines which gratings cannot be read out (and would thus minimally degrade system performance if present) and which gratings are most sensitive to tolerances in the system (utilizing these gratings for system performance would force tighter tolerances, extraneous gratings would degrade system performance). Reflection gratings to which the readout beam can be Bragg-matched to generate a counter-propagating reflected beam can be detected confocally.

A specific example of an advantageous format system according to the present invention will be described with respect to the media format structure, the writing system, and the readout system. Generalization and alternatives of the preferred embodiment will then be described.

An understanding of a few concepts are useful for understanding what is disclosed herein. Persons of ordinary skill in the holographic arts would readily understand these concepts and would further possess more extensive knowledge so as to be capable of extending these concepts to birefringent materials and other specialized cases.

Figure 1:
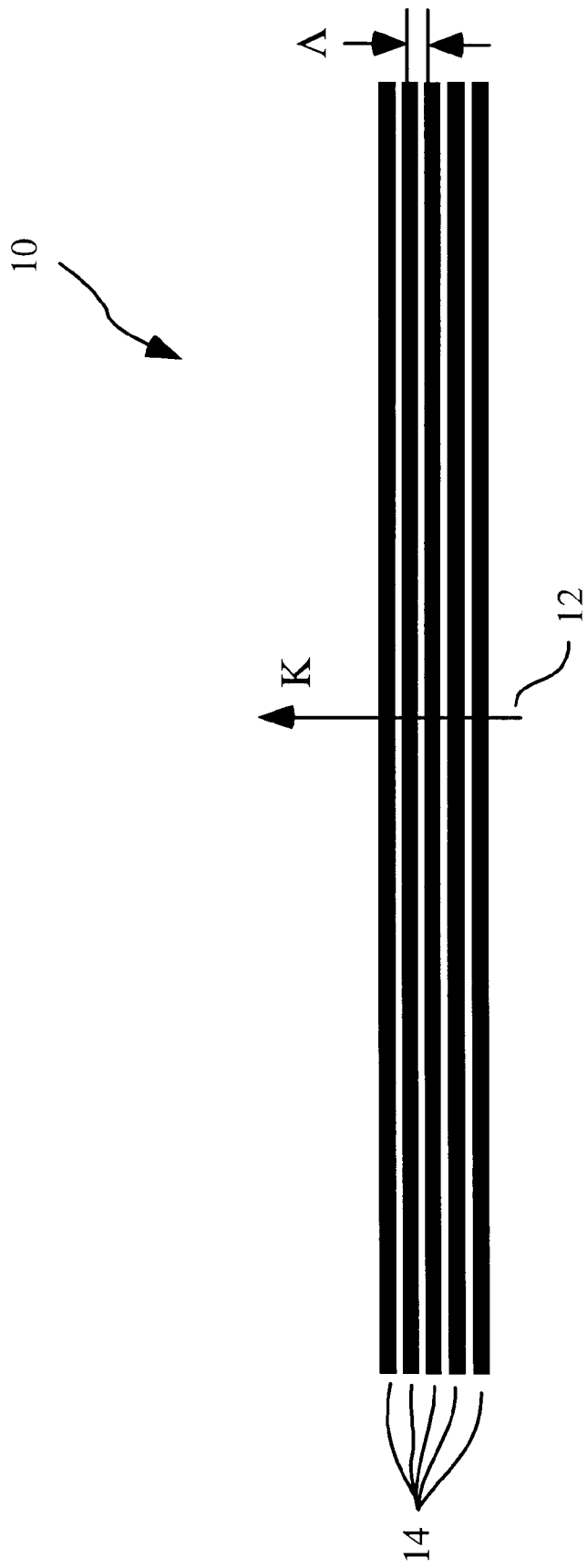
FIG. 1 is a diagrammatic cross-sectional representation of a simple format volume hologram in a storage media.

Referring first to FIG. 1, it may be seen that a simple format volume hologram 10 consists of a distributed reflectivity, for example, a single grating vector K (reference numeral 12) in an orientation normal to the surface of a disk (not shown). The direction of the K vector is normal to the fringes 14 (surfaces of constant phase), which are shown in an orientation parallel to the surface of the disk. The length of the vector is $2\pi/\Lambda$, where $\Lambda$ is the fringe period (distances between maxima in the direction normal to the fringes). An additional number, the phase of the grating, $\phi$ (not shown in FIG. 1), describes the location of a maximum with respect to a reference point.

Formally, a single grating (single spatial frequency) in infinite space has a continuous spectrum of spatial frequencies when localized to a finite spatial region. As the general practice, for simplicity, the K-vector is used to characterize a planar grating. A conical grating is characterized by the conical axes and a two-dimensional K-vector for its radial and axial projections.

Gratings exist in three-dimensional space. The two-dimensional views shown within the plane of the paper of FIG. 1 represent a cross-sectional slice. The K-vector shown in FIG. 1 also lies within the plane of the paper. In the drawing figures herein, persons of ordinary skill in the art will appreciate that the K-vectors lie completely or substantially within the two-dimensional cross-section plane shown in the figure.

Figure 2B:
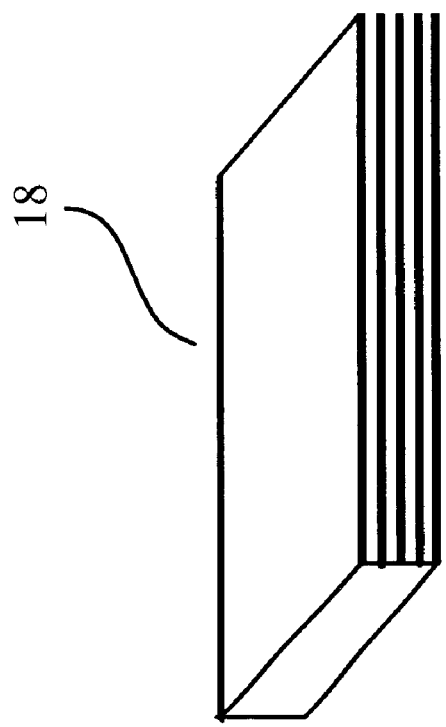
FIGS. 2A and 2B are representations of the format volume hologram of FIG. 1 extended into three dimensions rotationally and linearly, respectively.
Figure 2A:
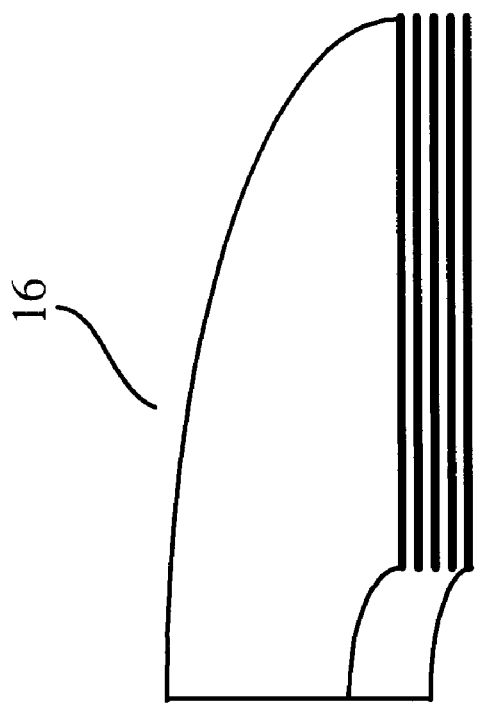

The two-dimensional views may be extended into the third dimension using Cartesian, cylindrical or other coordinates as illustrated in the perspective views of FIGS. 2A and 2B. When the grating cross section of FIG. 1 is swept around an axis of rotation, the representation of media 16 depicted in FIG. 2A results. Persons of ordinary skill in the art will appreciate that media 16 in FIG. 2A is an example of a media that can be formed in the shape of a disk which may be rotated relative to reading optics while in use.

When the grating cross section of FIG. 1 is moved rectilinearly into the page, the representation of media 18 depicted in FIG. 2B results. Persons of ordinary skill in the art will appreciate that media 18 in FIG. 2B is an example of a media that can be formed in the shape of a card or tape, etc., which may be moved rectilinearly relative to reading optics while in use.

A k-vector is normally thought to denote a particular "plane wave component". That is, the surfaces of constant phase in the laser beam occur along planes of infinite extent. This concept is generalized herein for use in cylindrical geometry. The k-vectors as drawn in the two-dimensional cross section are thought to define one-dimensional straight lines of constant phase. When extended into three-dimensional space along cartesian coordinates the lines define planes (as in the usual interpretation). When extended into three-dimensional space along cylindrical coordinates, the lines sweep out cones. In cylindrical geometry, the k-vectors in two-dimensional space are to be thought of as representing cones of constant phase in three-dimensional space, and are known as conical beams. Methods for generating conical beams are known; see e.g. U.S. Pat. No. 4,790,612 to Dickenson.

According to one method of the present invention, complex format gratings may be fabricated holographically by overlapping at least two pairs of mutually coherent beams in a medium which responds to the light. As previously noted, such media may be formed from materials such as photopolymers.

A traveling laser beam with a free space wavelength $\lambda$ will be represented by a vector k. The direction of the k-vector will be in the direction normal to the fringes in the optical wave (this is also the direction of energy propagation.). The length of the k-vector is $2\pi n/\lambda$ where n is the index of refraction through which the light propagates.

For a given writing laser, $\lambda$ is fixed and hence the length of the k-vector is fixed. The direction of the laser beam (the direction of the k-vector) may lie in any direction. Therefore, the locus of all possible k-vectors describes a sphere. In many instances described here, the directions of the beams are restricted to a plane and the locus of possible k-vectors may be drawn as a circle 20 as is shown diagrammatically in FIG. 3.

Figure 3:
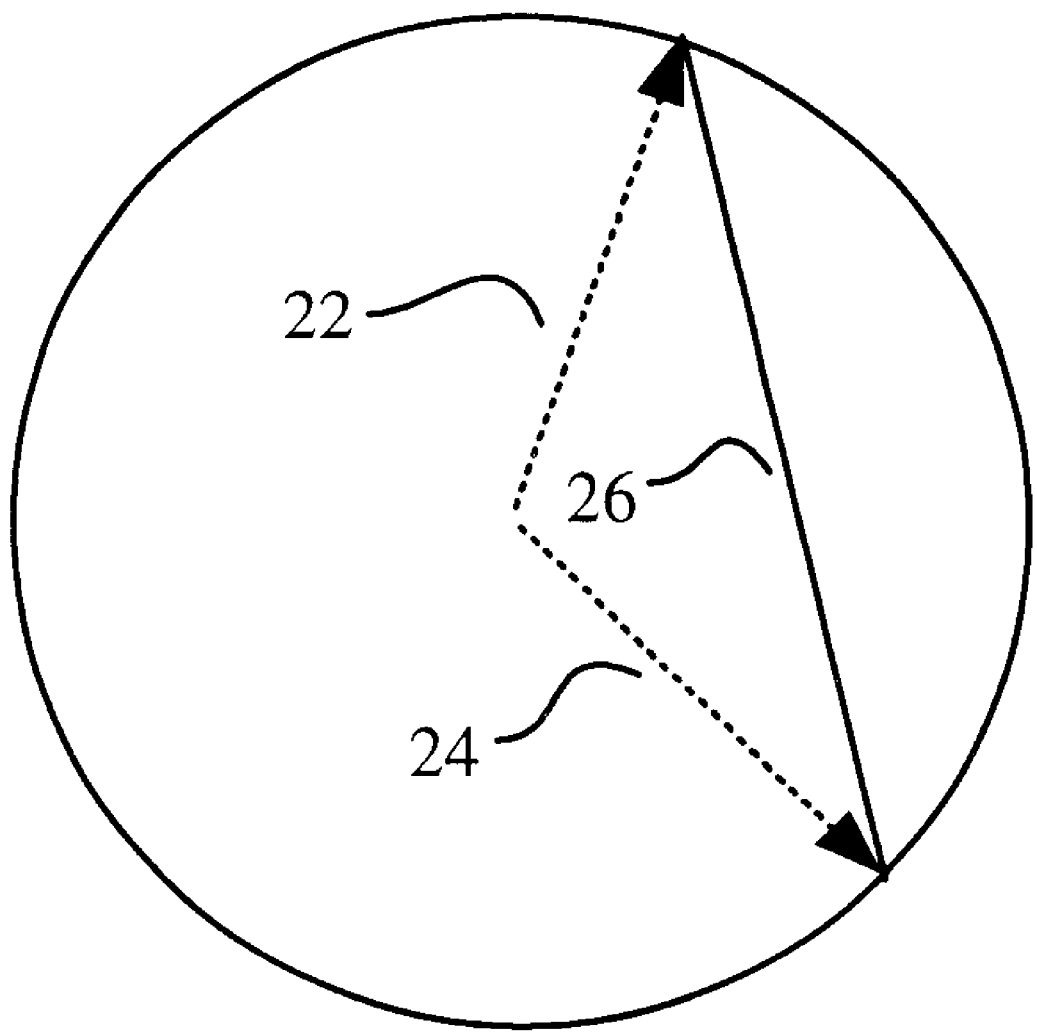
FIG. 3 is a representation of the locus of all possible k vectors in the case where the directions of the writing beams are restricted to a plane.

Two mutually coherent laser beams will write the grating with a K-vector which is the difference between the writing beam k-vectors. In FIG. 3, laser beams 22 and 24 are shown producing K-vector 26.

As is apparent from the preceding disclosure, a grating is the periodic modulation of a physical material property in the storage media. As will be apparent from an examination of this disclosure, multiple, discrete gratings produce modulation patterns which benefit volumetric data storage in many ways.

According to the present invention, multiple, discrete gratings are used to define a coordinate system within a three-dimensional storage medium to assist data storage functions. A key characteristic of the disclosed complex format hologram gratings of the present invention is the small spatial frequency content (multiple, discrete gratings) which lead to a periodic structure. The periodic structure generated by the multiple gratings may be associated with the location of data storage tracks. One advantage of this association is that the well-defined tracks may reduce the size of the stored physical bits, increasing storage density. This feature may be particularly advantageous when the period of separation between the nulls of the tracks is less than the width of a data mark. Another practical use of associating tracks with the periodic grating structure is to derive a signal from the periodic grating structure which may be used by servo control systems for tracking, focusing, etc. The periodic structure thus also improves the servo channels, which include the focus error signal and the radial tracking error signal.

The strength of the individual grating components may be varied to change the modulation depths of the interference pattern. The phase of the gratings may be changed to shift the phase of the interference pattern.

When a complete format hologram grating comprises three component gratings, two relative phases exist between the component gratings (one phase may be arbitrarily set to zero). These two phase parameters determine the phase of the interference pattern. Changing the relative phase of a component grating by shifting the phase angle of one of the beams used to form it will shift the interference pattern by the same phase angle that the component grating is shifted (when the interference pattern changes phase, the pattern shifts position but not shape). As will be appreciated by persons of ordinary skill in the art, methods for changing the relative phases between two beams is well known.

When a complete format hologram grating comprises two component gratings, it has one phase parameter and the interference pattern can be moved in only one direction. When four or more component gratings are present, three or more phase parameters are present. The interference pattern can shift in two directions and change in shape.

Figure 4A:
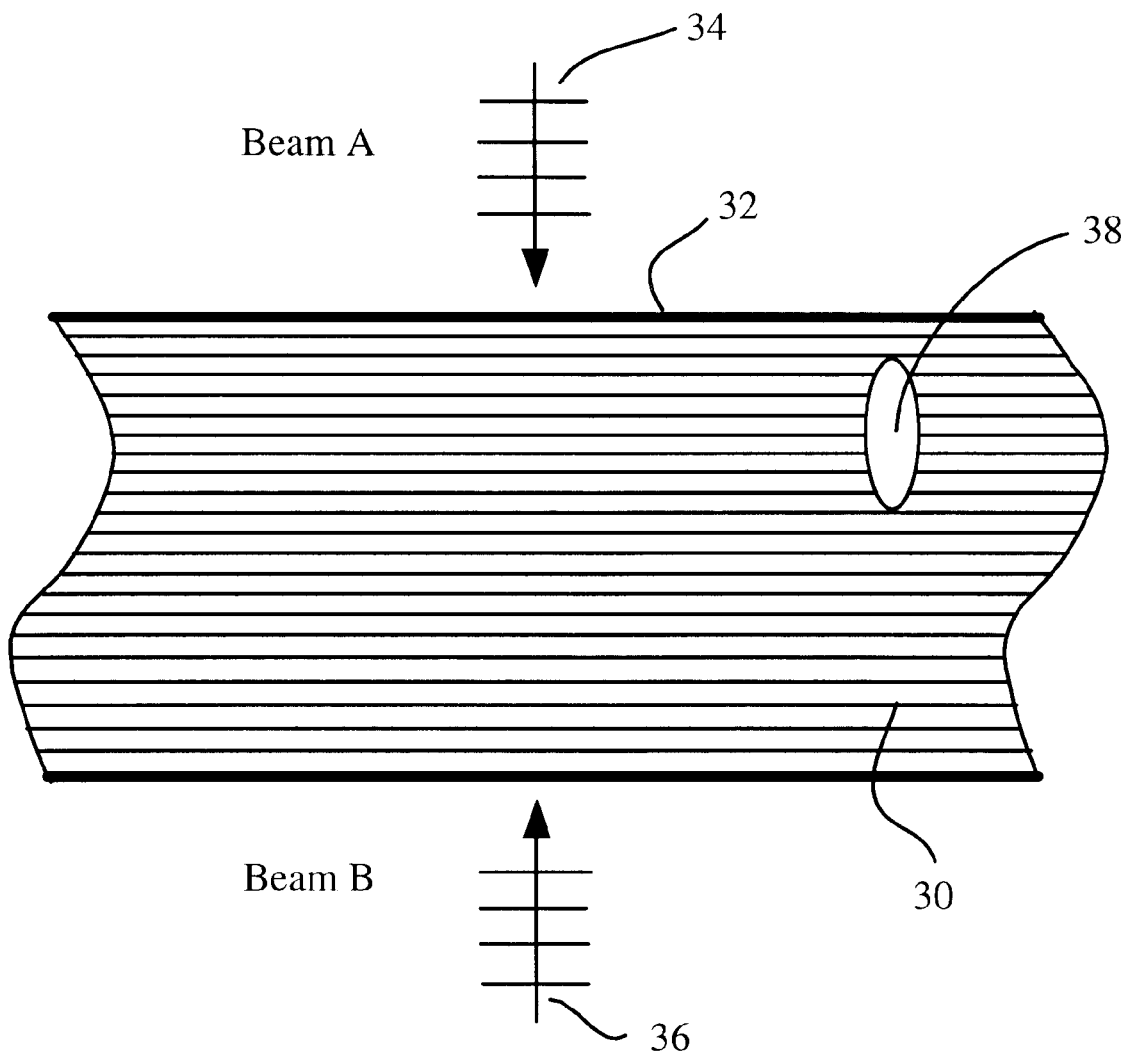
FIG. 4A is a schematic diagram showing how a simple format volume hologram may be written onto a photoactive storage medium by exposing a holographic material to two beams of mutually coherent light.

Controlling the phase of the component gratings may be used according to the present invention to achieve absolute positioning of the composite pattern, to move the pattern as a function of theta position (e.g. wobble tracks for servo reading), etc Referring now to FIG. 4A, a schematic diagram shows how a simple format volume hologram 30 may be written onto a photoactive storage medium 32 by exposing a holographic material to two beams of mutually coherent light indicated at reference numerals 34 and 36. For example, as shown in FIG. 4A, two plane waves generate a planar reflection hologram, whose orientation and frequency are governed by the wavelength and angles of incidence. In particular, Beam A (reference numeral 34) and Beam B (reference numeral 36) are incident on opposite sides of the photoactive storage medium 32.

A simple format hologram 30 such as illustrated in FIG. 4A can reflect the Bragg-matched components from a focused beam of light. Light reflected from the focus of an incident beam of light may be measured by confocal detection, which measures the light reflected at the focus of the beam.

Selective localized alteration serves to change the reflectivity at the beam waist (or beam focus) by locally changing the properties of the hologram. This change in reflectivity is detected by a confocal detection channel. In this manner, data are represented by the changes in reflectivity of the format hologram. This property is the basis for a data storage system that operates by selective localized alteration of a format hologram, particularly in which the selective localized alteration changes the reflectivity of a focused beam. Data are represented by the changes in reflectivity of the format hologram at the sites of the selective localized alteration.

One data bit is shown diagrammatically in FIG. 4A as region 38, which disrupts hologram 30 in medium 32. Persons of ordinary skill in the art will appreciate that one method of data encoding according to the present invention is to represent one binary data state by leaving the reflectivity of the format region unaltered at a bit location and to represent the other data state by altering the reflectivity of the format hologram at a bit location as is illustrated by region 38. The format hologram depicted in FIG. 4A and methods for forming it, writing to it, and reading from it are the subject matter of co-pending application Ser. No. 09/016,382 filed Jan. 30, 1998.

As will be appreciated by persons of ordinary skill in the art, if the medium 32 of FIG. 4A is extended in cartesian space as was shown in FIG. 2B, as would be encountered on a medium formed as a card or a strip, significant amounts of data can be stored thereto and read therefrom.

Figure 4B:
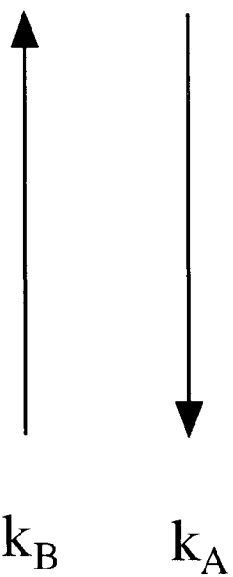
FIGS. 4B and 4C are vector diagrams representing the writing beams and the resulting simple format hologram of FIG. 4A.
Figure 4C:
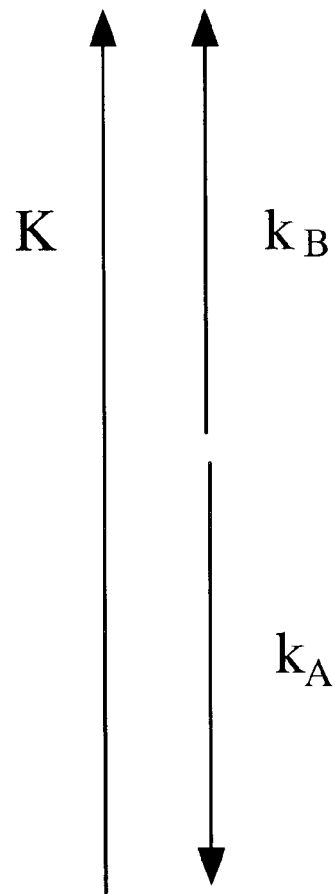

Referring now to the vector diagrams of FIGS. 4B and 4C, it may be seen that Beam A has wave vector $k_A$ and Beam B has wave vector $k_B$ (FIG. 4B). The grating vector of the resulting hologram is $K_A$ which equals $k_B - k_A$ (FIG. 4C).

The planar structure of the hologram shown in FIG. 4A is satisfactory for data storage but is limited in the density of data which can be stored thereon and retrieved therefrom. Although the format hologram of FIG. 4A can be used to store data at multiple data layers, data density can be increased according to the present invention by defining multiple layers or tracks upon which the data can be arranged. Layer and/or track definition generally requires a more complex format hologram grating structure than the planar structure described above.

A complex format grating generally comprises multiple component gratings. To write multiple gratings, multiple pairs of mutually coherent laser beams may be used to write multiple holograms. It is preferable, but not necessary, to write multiple gratings simultaneously so that changes in material parameters (e.g., sensitivity—the response for a given exposure energy) do not need to be fully characterized or taken into account.

Figure 5A:
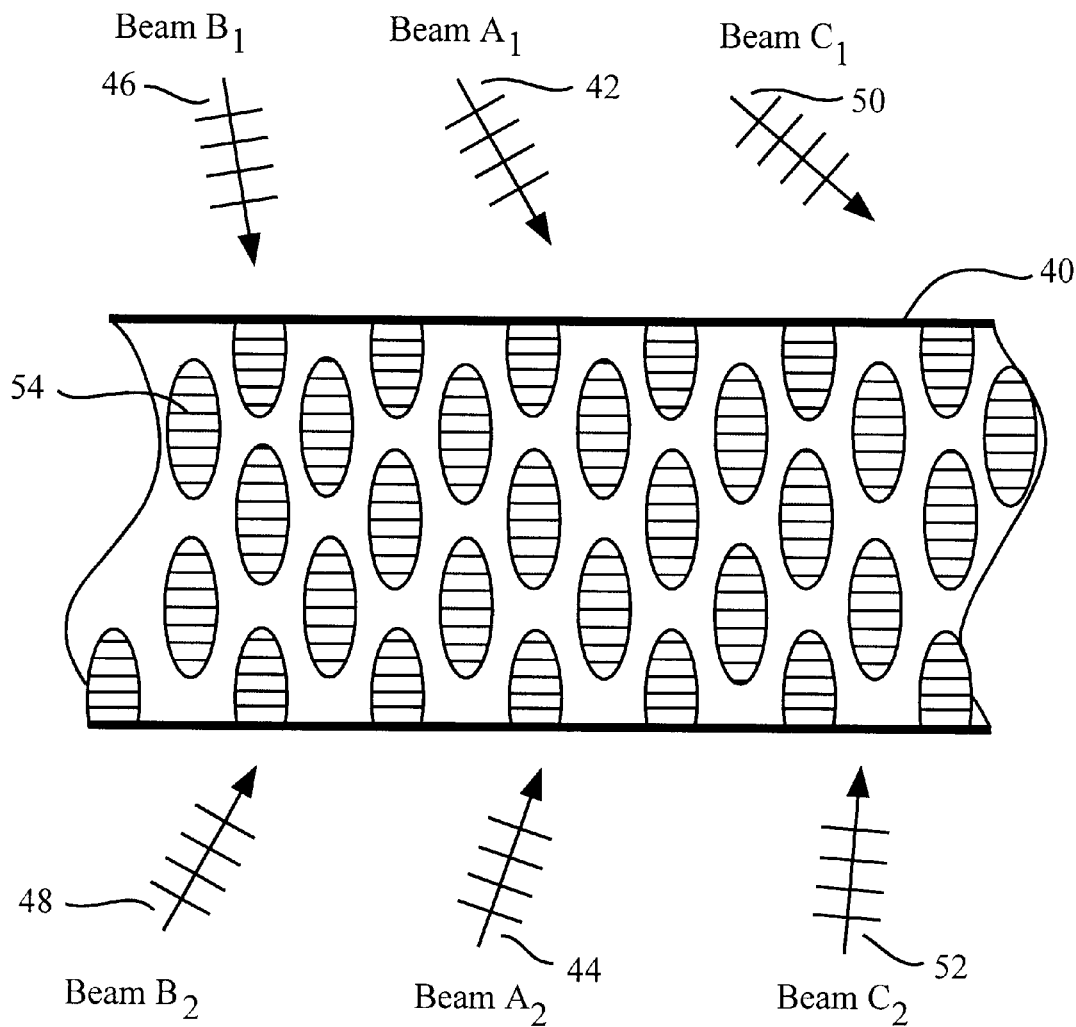
FIG. 5A is a cross-sectional view of a photactive medium illustrating the writing of a complex format grating using three pairs of mutually coherent beams.

FIG. 5A is a cross sectional view of a photoactive medium 40 that illustrates writing three gratings by using three pairs of mutually coherent beams ($A_1A_2$), ($B_1B_2$), and $C_1C_2$), shown at reference numerals 42–44, 46–48, and 50–52, respectively. The resultant complex format grating creates tubes or tracks, one of which is identified by reference numeral 54.

To write gratings sequentially, the beam pairs are incident sequentially. To write the desired gratings simultaneously without introducing additional gratings, the beam pairs must not interact. This can be achieved, e.g., by employing mutually incoherent pairs of mutually coherent beams.

Figure 5B:
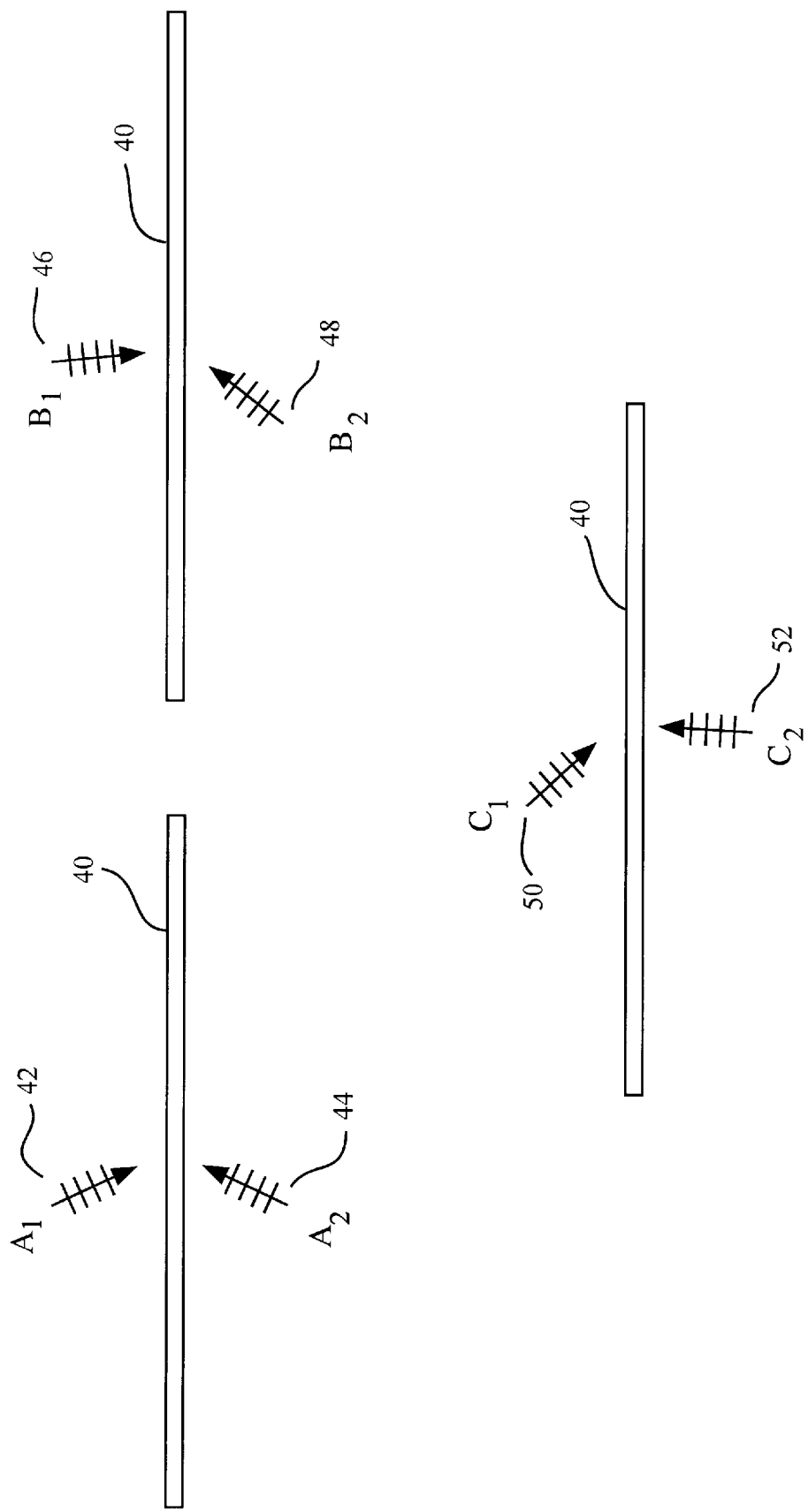
FIG. 5B is a series of cross-sectional views of the medium of FIG. 5A showing the orientations of the three beam pairs.

FIG. 5B illustrates the beam pairs that may be used to generate component gratings comprising the complex format gratings in the example of FIG. 5A. Thus beams 42 and 44 create a first hologram, beams 46 and 48 create a second hologram, and beams 50 and 52 create a third hologram. Each beam pair gives rise to a reflection grating, so that three resulting component reflection gratings result in the tubular format structure shown in cross section in FIG. 5A. The beam pairs can be used all at once to record component gratings simultaneously if they are present simultaneously, or may be used sequentially in the pairs shown in FIG. 5B. Persons of ordinary skill in the art will realize that the cross sections in FIGS. 5A and 5B represent sections of plane waves for cartesian arrangements and sections of conical waves for disk arrangements.

Figures 5C, 5D:
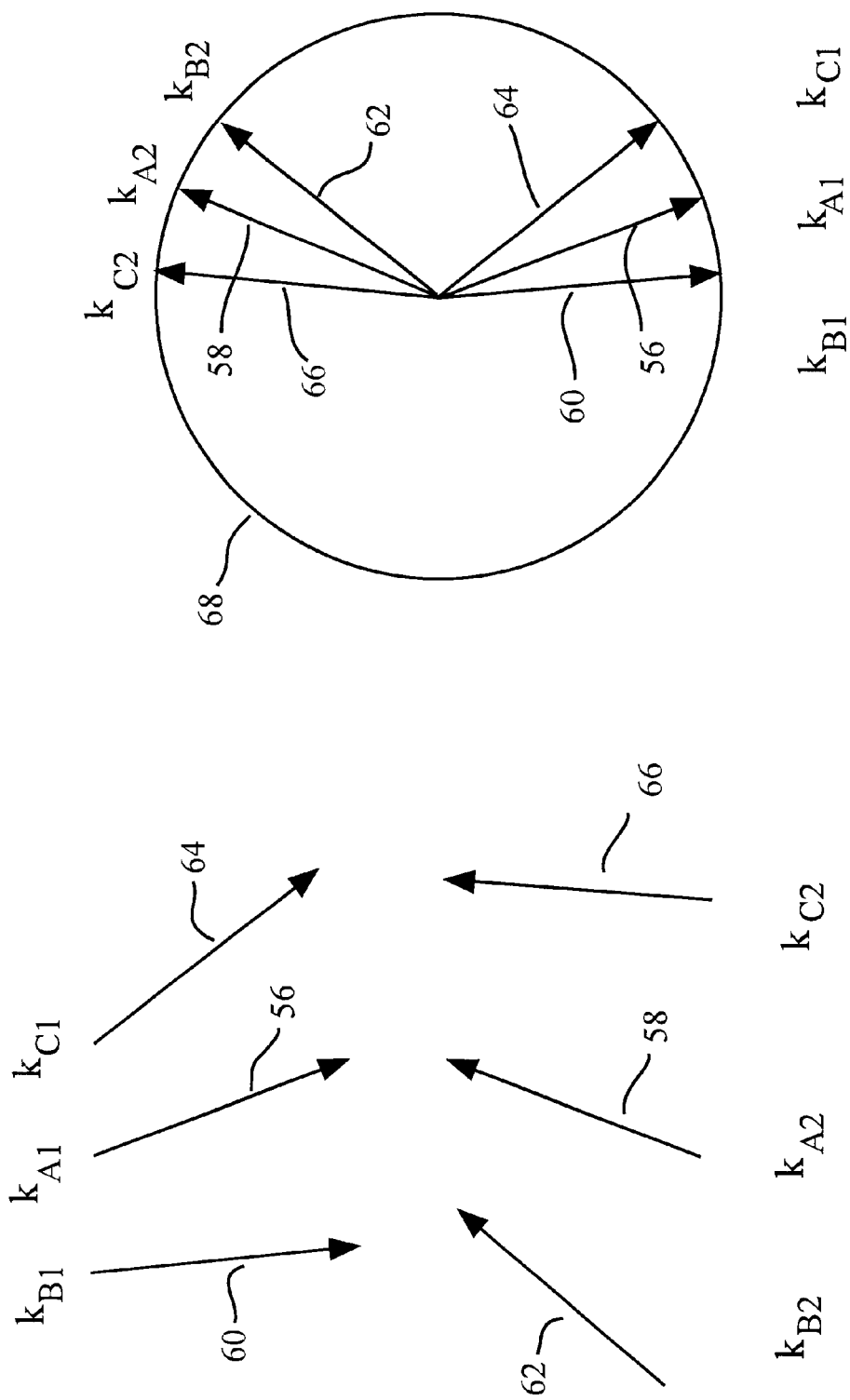
FIGS. 5C through 5F are diagrams showing the wave vectors for the beams used the embodiment of FIGS. 5A and 5B.
Figure 5F:
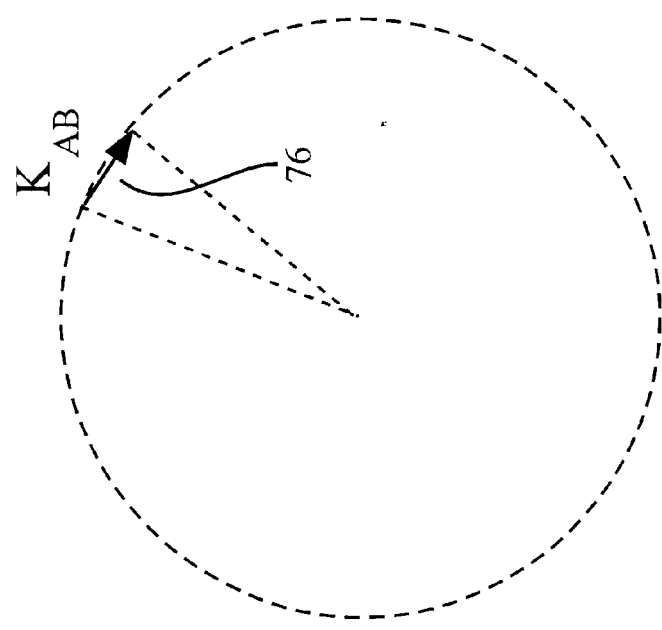
Figure 5E:
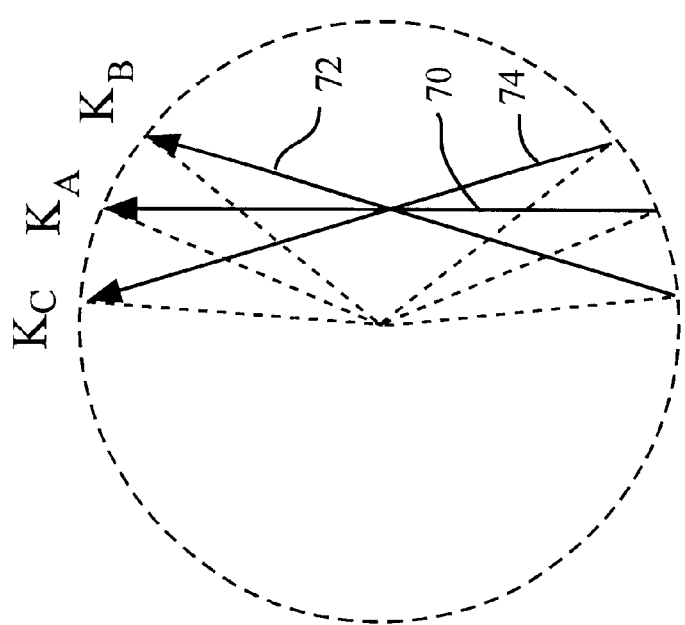

Referring now to the vector diagrams of FIGS. 5C through 5E, it may be seen that Beams $A_1$, $A_2$, $B_1$, $B_2$, $C_1$ and $C_2$ have wave vectors $k_{A1}$, $k_{A2}$, $k_{B1}$, $k_{B2}$, $k_{C1}$, $k_{C2}$, shown at reference numerals 56, 58, 60, 62, 64, and 66, respectively. FIG. 5C illustrates the wave vectors separately, and FIG. 5D illustrates the wave vectors oriented with respect to a Bragg sphere 68. Generally, the wave vectors fall on a sphere in free space and in isotropic materials. Persons of ordinary skill in holography will know how to similarly analyze the wave vectors for birefringent materials.

FIG. 5E illustrates three grating vectors for constituent hologram gratings that generally result from three beam combinations: $(A_1, A_2)$, $(B_1, B_2)$, and $(C_1, C_2)$: $KA=k_{A2}-k_{A1}$ (reference numeral 70); $KB=k_{B2}-k_{B1}$ (reference numeral 72); and $KC=k_{c2}-k_{C1}$ (reference numeral 74). The dashed lines represent the wave vectors of FIG. 5D. The grating vectors 70, 72, and 74 in FIG. 5E represent individual component reflection hologram gratings. A reflection hologram is generally a hologram in which the diffracted beam of light leaves the hologram from the same side as the incident beam of light.

When pairs of beams used to write separate reflection holograms are present simultaneously, transmission holograms may result from the interaction of beams of different pairs. A transmission grating is generally a hologram in which the diffracted beam of light leaves the hologram from the opposite side as the incident beam of light. FIG. 5F illustrates a grating vector 76 for a constituent hologram grating that can result from the interaction of Beams A2, B2. Similar grating vectors may arise from two beams incident on the same side of the hologram. Generally, when pairs of beams used to write separate reflection holograms do not interact (e.g. they are mutually incoherent pairs of coherent beams), transmission holograms do not result.

Figure 6:
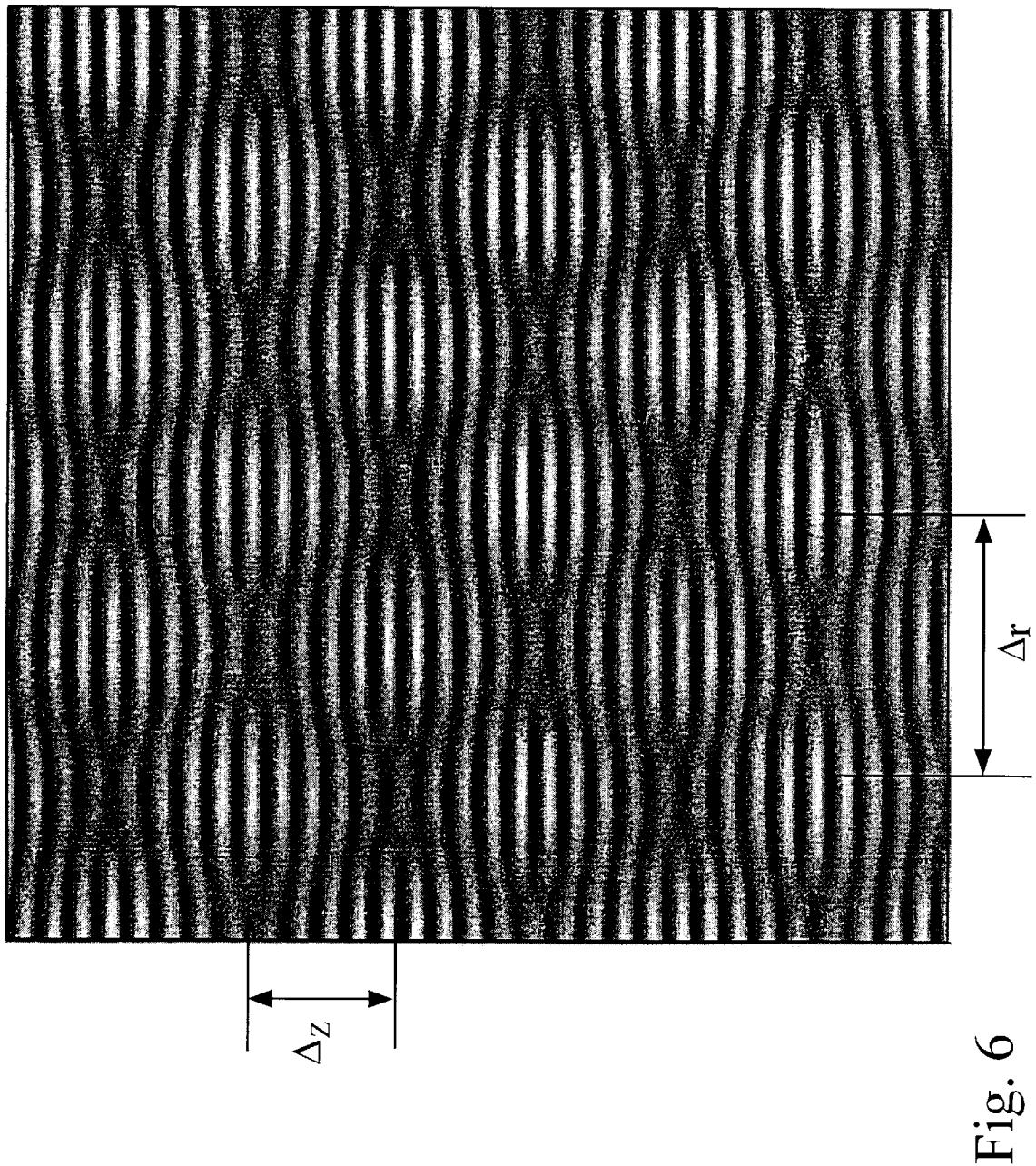
FIG. 6 is a cross sectional view of a portion of a photoactive medium illustrating a complex format grating structure having three component gratings such as those shown in FIGS. 5A and 5B.

Once a format hologram grating structure has been recorded as shown in FIGS. 5A and 5B, a cross section will have a grating structure for which a portion is shown in FIG. 6. FIG. 6 illustrates generally a slice of a cross section for a format hologram resulting from the superposition of grating vectors $K_{12}$, $K_{13}$, and $K_{14}$. The tubes or tracks can be seen in FIG. 6 as the regions where the contrast between fringes is highest. If, for example, the medium is a card, then the hologram can represent the cross section that extends symmetrically along the length of the card. If the medium is a disk, then the hologram can represent the cross section that extends circumferentially around the disk.

Two-dimensional projections of wave vectors and grating vectors in the plane of the cross section of FIG. 6 can be seen in FIGS. 5C through 5E.

A focussed diffraction-limited beam incident on the format hologram will reflect from the hologram if it is properly Bragg matched. Selection of the hologram properties, laser wavelength, numerical aperture, and spherical aberration correction is described in detail in co-pending U.S. patent application Ser. No. 09/016,382 filed Jan. 30, 1998, and assigned to the same assignee as the present invention. Generally, the format gratings define layers with individual tracks, in which track and layer centers exhibit highest reflectivity, and positions between tracks and layers exhibit lower reflectivity. In FIG. 6, the quantity $\Delta z$ represent the separation of layers as measured from neighboring tracks, and the quantity $\Delta r$ represents the separation of tracks in the same layer.

Generally, a small wavelength shift of the probe light with respect to the wavelength of the recording beam can result due to material shrinkage, change in the mean index of refraction, and the Guoy shift. Persons skilled in the art of holography will know which wavelength and beam orientations to choose to record the format hologram so that a probe beam of a particular wavelength and numerical aperture will be Bragg matched to the hologram at its focus.

Figure 7:
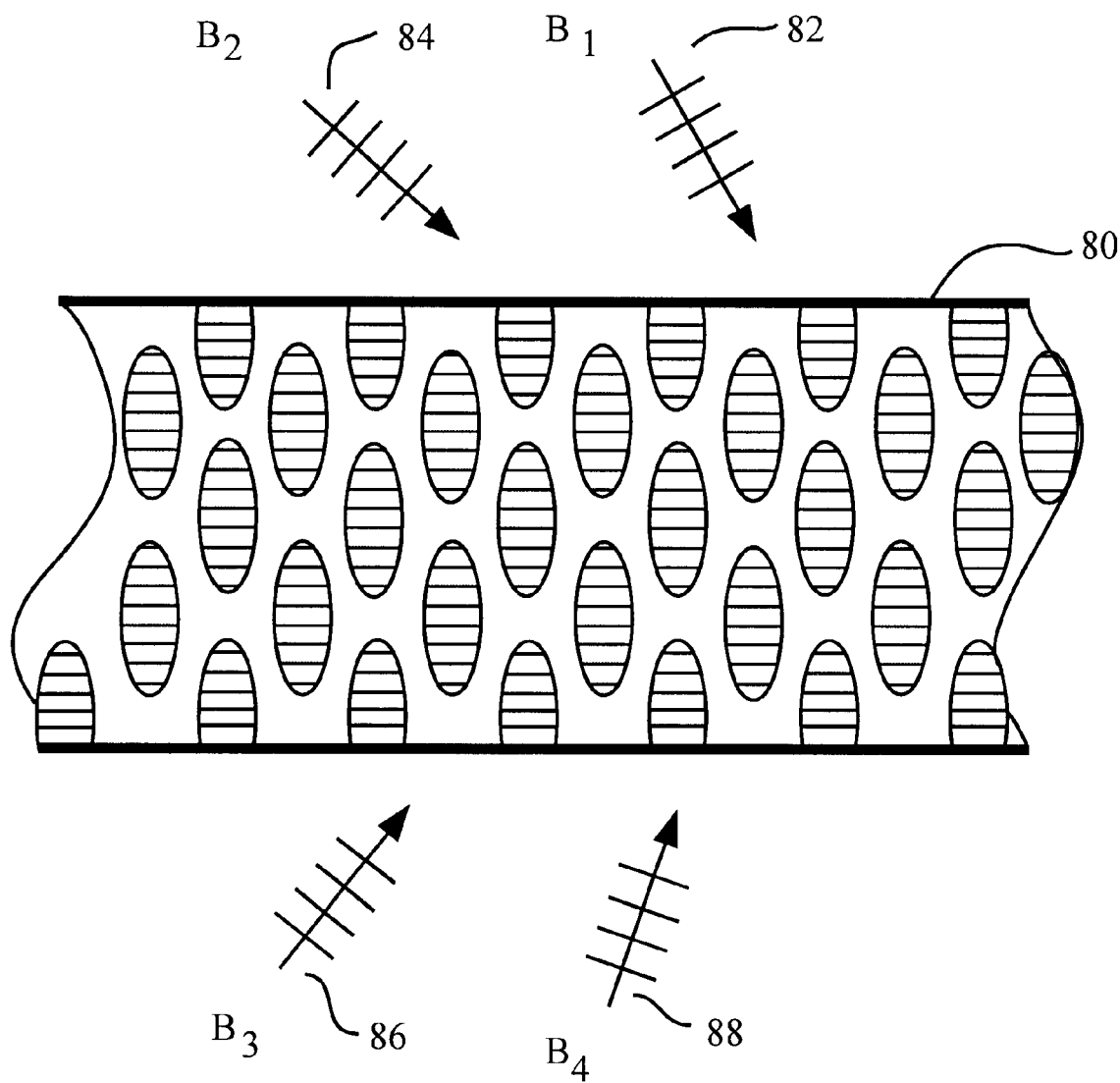
FIG. 7 is a cross sectional view of a photoactive medium illustrating the use of four beams, two above, and two below, to write a complex format grating structure according to the present invention.

In one embodiment of the present invention, four beams of light generate at least three component gratings. Referring now to FIG. 7, a cross sectional view of a medium 80, four beams of light $B_1$ through $B_4$ (shown at reference numerals 82, 84, 86, and 88, respectively) are incident on the medium, simultaneously or sequentially in pairs to create the complex format grating hologram shown disposed in the volume of the medium 80. For sequential illumination, beam pairs $B_1-B_3$, $B_1-B_4$, $B_2-B_3$, and $B_2-B_4$ can be used to record component gratings sequentially. By adjusting the angles of the beams, the desired wavelength and numerical aperture of the probe beam can be selected for Bragg matching at its focus. The wavelength can be substantially different from the recording wavelength.

Figure 8D:
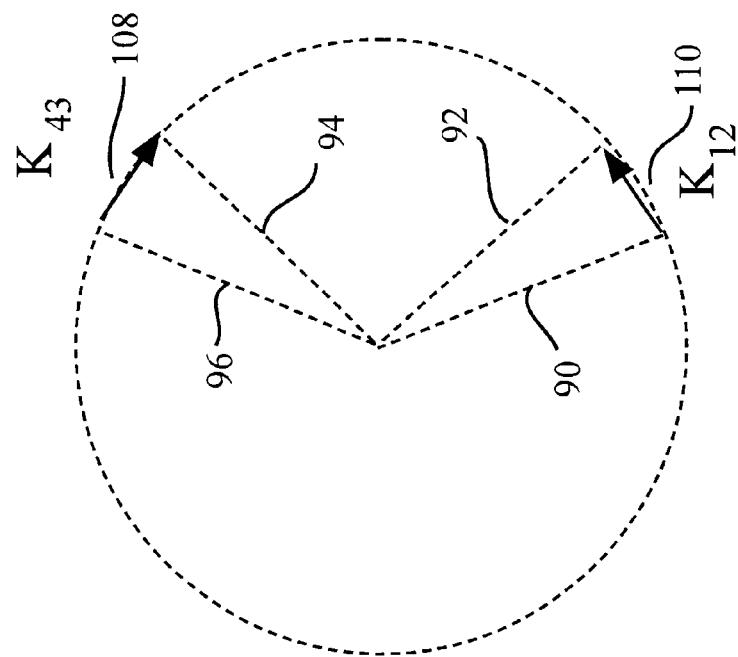

Referring now to FIGS. 8A through 8E, wave vectors of the incident light beams and the resulting grating vectors are shown. Beams $B_1$, $B_2$, $B_3$, and $B_4$ have wave vectors $k_1$, $k_2$, $k_3$, and $k_4$4, (shown at reference numerals 90, 92, 94, and 96) respectively. Beams $B_1$ and $B_4$ are incident at equal and opposite angles, and Beams $B_2$ and $B_3$ are incident at equal and opposite angles. FIG. 8A illustrates the wave vectors separately, and FIG. 8B illustrates the orientations of the wave vectors with respect to a Bragg sphere 98. Generally, the wave vectors fall on a sphere in free space and in isotropic materials. An artisan skilled in holography would know how to arrange the wave vectors for birefringent materials.

Figure 8C:
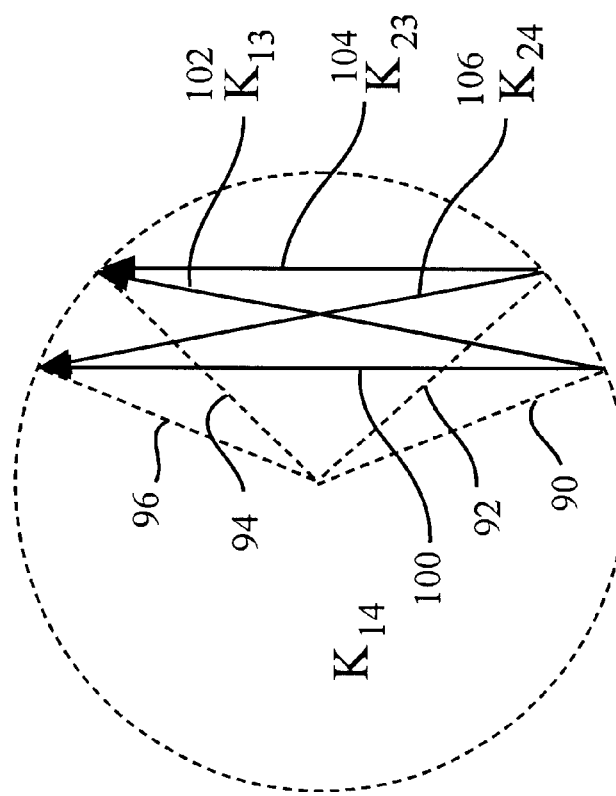

FIG. 8C illustrates four grating vectors for component hologram gratings 100, 102, 104, and 106 that generally result from beam combinations $(B_1, B_4)$, $(B_1, B_3)$, $(B_2, B_3)$, and $(B_2, B_4)$, in which $K_{14}=k_4-k_1$, $K_{13}=k_3-k_1$, $K_{23}=k_3-k_2$, and $K_{24}=k_4-k_2$. The dashed lines 90, 92, 94, and 96 represent the wave vectors of FIGS. 8A and 8B. These wave vectors represent reflection hologram gratings. As in the general case, a reflection hologram is generally a hologram in which the diffracted beam of light leaves the hologram from the same side as the incident beam of light.

Figure 8E:
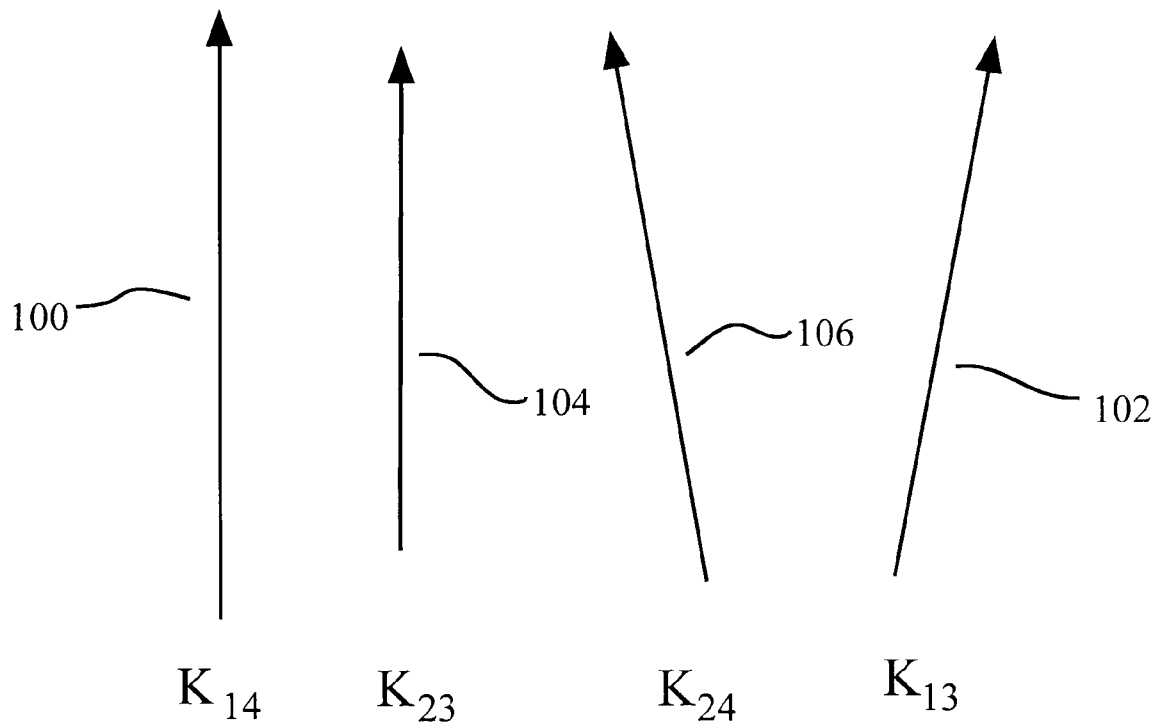

FIG. 8D illustrates two grating vectors 108 and 110 for constituent hologram gratings that generally result from beam combinations ($B_3$, $B_4$), ($B_1$, $B_2$), for which $K_{43}=k_3-k_4$, $K_{12}=k_2-k_1$, respectively. The dashed lines 90, 92, 94, and 96 represent the wave vectors of FIG. 8B. These wave vectors represent transmission hologram gratings. As in the general case, a transmission hologram is generally a hologram in which the diffracted beam of light leaves the hologram for the opposite side as the incident beam of light. FIG. 8E illustrates the reflection grating vectors $K_{14}$, $K_{13}$, $K_{23}$, and $K_{24}$ separately.

Figure 9B:
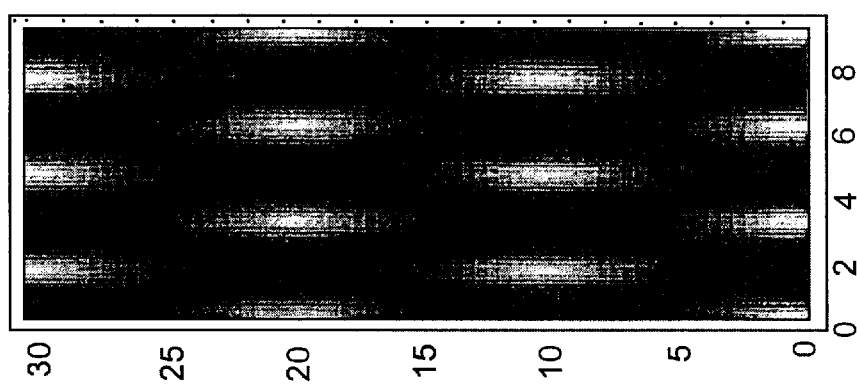
FIG. 9B is a diagram illustrating the magnitude of the index perturbation locally for the complex grating fringes of FIG. 9A, for which the carrier frequencies have been removed in the figure to illustrate the modulation envelope.
Figure 9A:
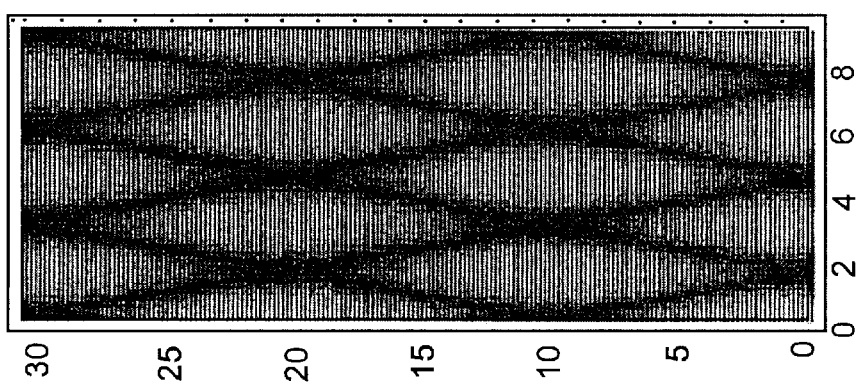
FIG. 9A is a diagram illustrating generally the cross section of the fringes resulting from use of the format gratings in FIG. 8E.

Referring now to FIGS. 9A and 9B, two different cross-sectional views of a formatted media according to the present invention illustrate the complex format grating structure of the embodiment of FIG. 7. The format grating hologram shown in these figures has been written with grating wave vectors $K_{14}$, $K_{13}$, $K_{23}$, and $K_{24}$ in which the component grating amplitudes are comparable. FIG. 9A is a diagram illustrating generally the cross section of the resulting interference fringes. As persons of ordinary skill in the art will appreciate from the present disclosure, the cross section can correspond to plane waves for a card medium, or axiconical waves for a disk. FIG. 9B illustrates the magnitude of the index perturbation locally, for which the carrier frequencies have been removed in the figure to more clearly illustrate the modulation envelope. The grating envelope illustrated in FIGS. 9A and 9B is a general indication of the expected reflectivity for a high numerical aperture, diffraction-limited beam focussed into the medium.

Figure 10:
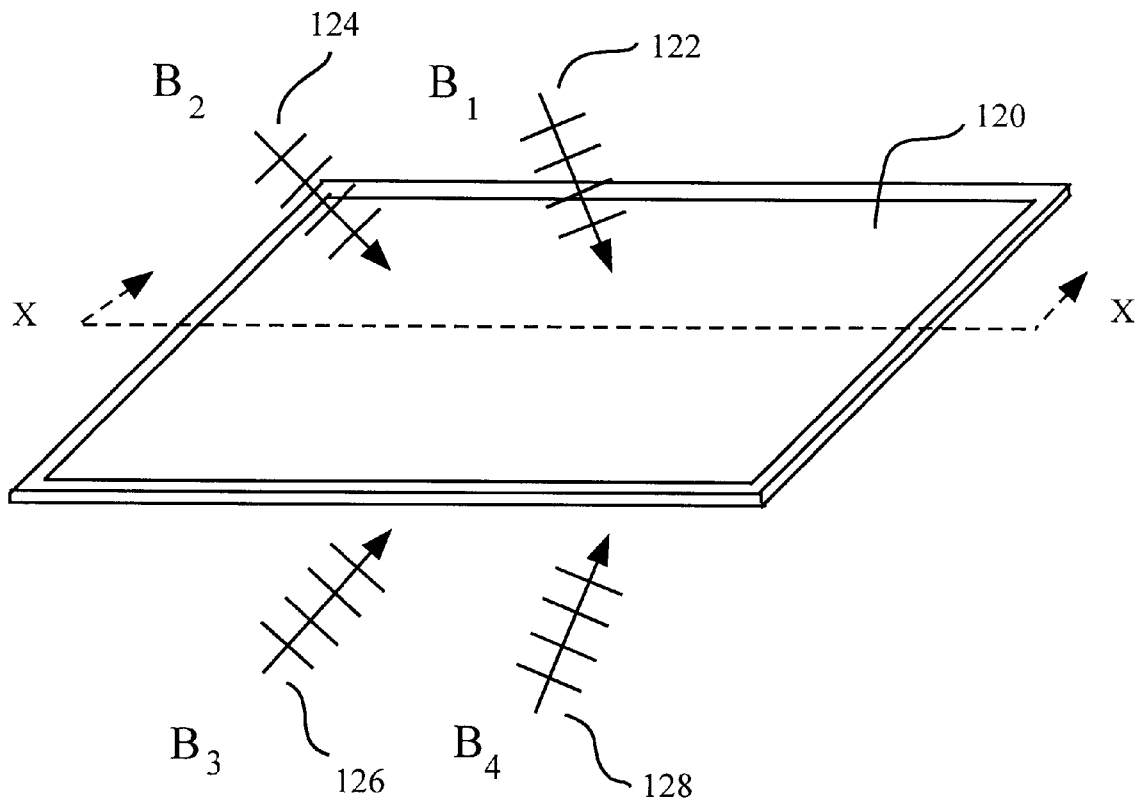
FIG. 10 is a diagram showing an orientation of beams that may be used according to the present invention to write a complex format grating on a medium such as a card.

Referring now to FIG. 10, a diagram shows the orientation of beams used to write a complex format grating hologram on a medium 120 such as a card. Plane waves 122, 124, 126, and 128 are shown to be incident on the medium 120 to generate the required gratings.

Figure 11:
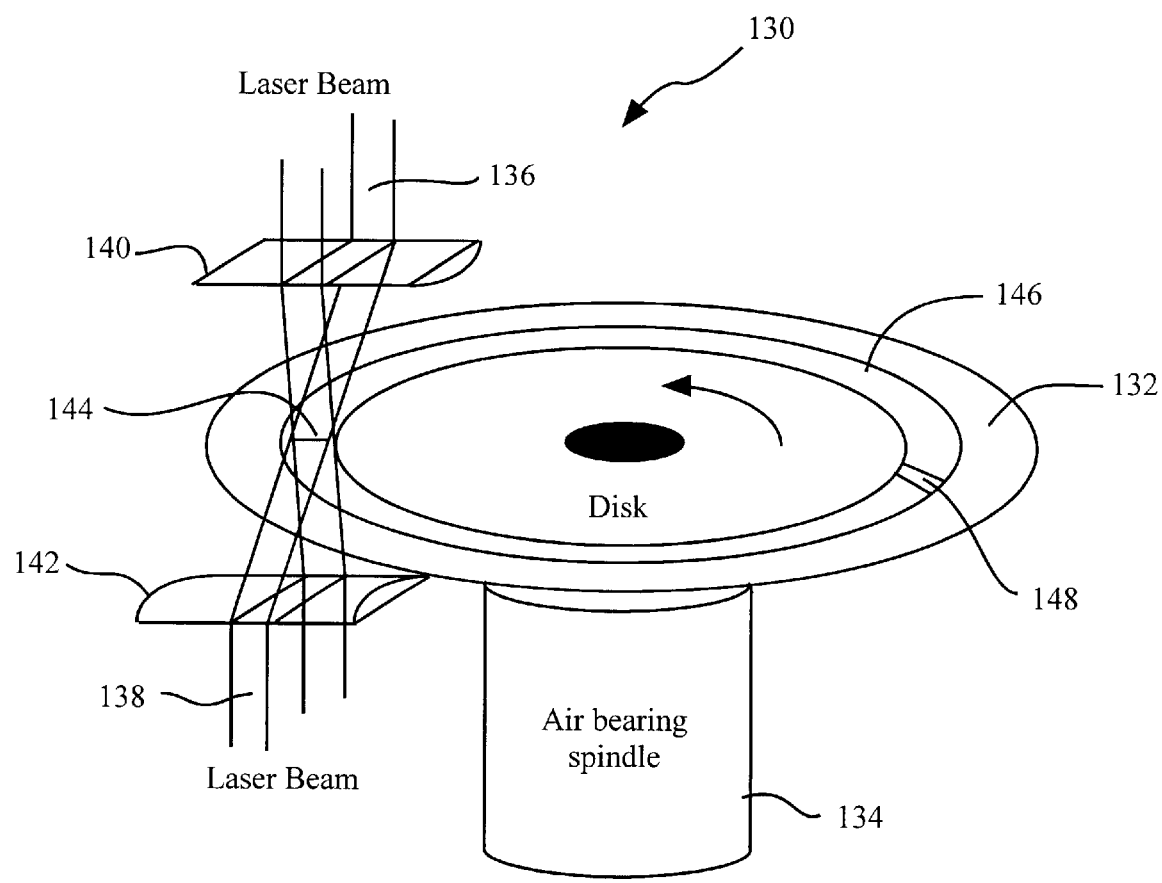
FIG. 11 is a simplified diagram showing features of a general format grating hologram recording device designed to write format holograms on a disk.

Referring now to FIG. 11, a general format hologram recording device 130 designed to write format holograms on a disk is illustrated to identify features of such a device. The device is shown in operation in which two beam pairs are present to write a simple planar component format grating hologram on a rotatable medium 132 shown as a disk. Rotatable medium 132 is mounted on a rotating air-bearing spindle 134 or other device for providing rotational energy. Air-bearing spindles for rotating storage media are well known in the art. Only a single beam pair is shown in FIG. 11 in order to avoid overcomplicating the drawing figure. Additional conical component format grating holograms can be written to the medium 132 through the addition of other beam pairs, either sequentially or simultaneously, to write additional component gratings that together comprise a complex format grating according to the present invention.

Counterpropagating beams 136 and 138 are focused cylindrically by cylindrical lenses 140 and 142 so that their depths of focus are coincident with each other along a line 144 lying within the cylindrical storage region 146 of the material. The depth of focus can be characterized by the Rayleigh range of the focus or any other suitable measure. Persons of ordinary skill in the art will know how to select the optics appropriately to generate the desired depth of focus and beam width for particular physical arrangements of the optical elements and medium used.

The disk 132 continuously rotates during recording of the complex format hologram, so that the format hologram spans the disk at a desired depth in its bulk in cylindrical region 146. Precision positioning or phase control of the beams can be used to match the hologram fringes at the beginning of the recording process to those at the end. Alternatively, a small gap (shown as line 148) can be intentionally left between the beginning of the fringes and the end of the fringes to define the beginning of a track. Other small gaps may also be intentionally left at selected angular positions throughout storage region 146 to define sectors if desired. Alternatively, gaps may also be left for data recording in conjunction with a sampled servo.

Figure 12:
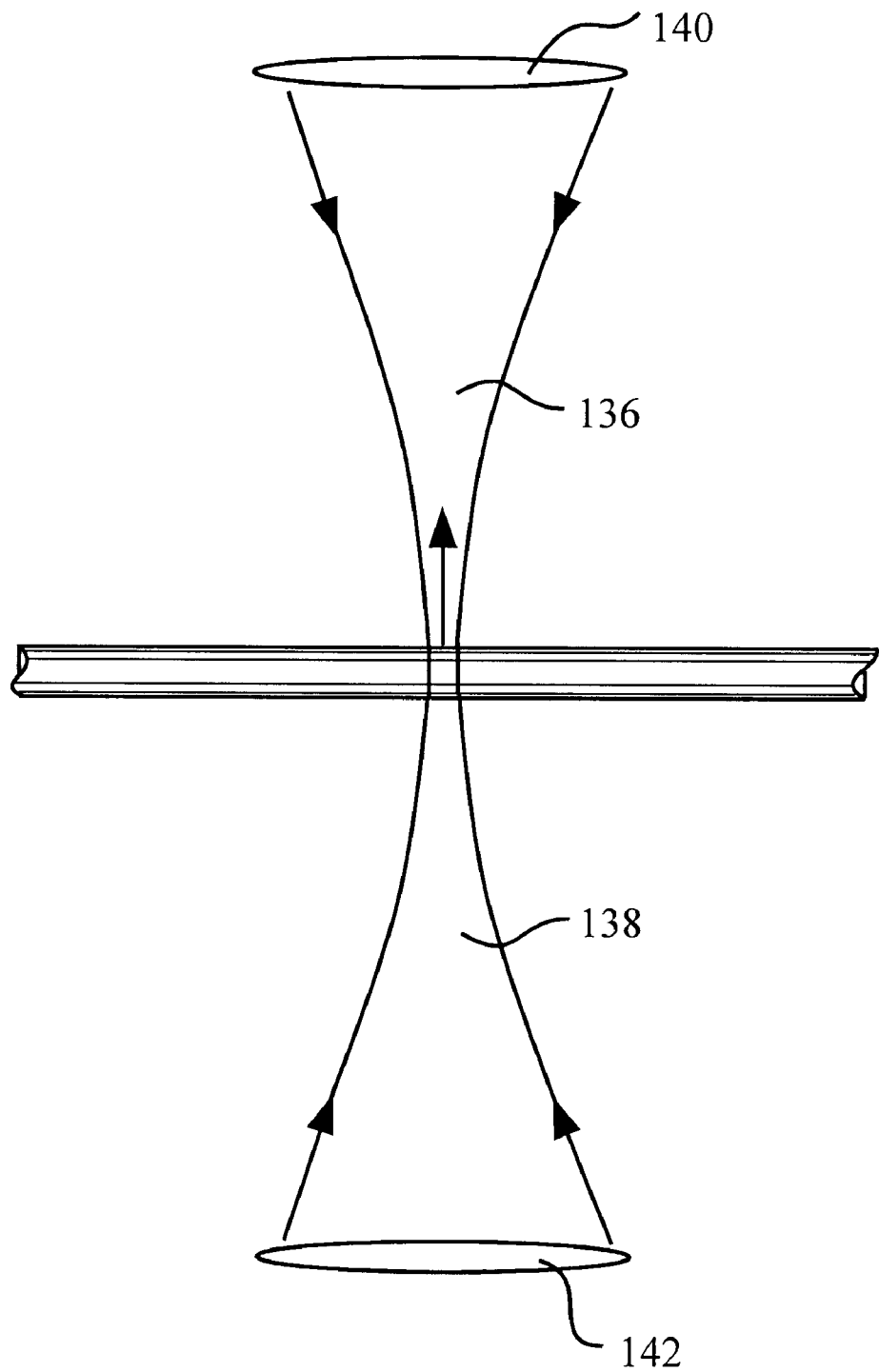
FIG. 12 is a diagram illustrating the finite depth of focus of the cylindrically focussed beams of the device of FIG. 11.

Referring now to FIG. 12, a cross-sectional view of a portion of the medium 132 of FIG. 11, the cylindrically focussed beams 136 and 138 are seen to have a finite depth of focus. In one embodiment of the present invention, the medium 132 may be placed substantially within the depth of focus of the optical system to ensure that the resulting fringes are substantially parallel to the tangent of the direction of rotational motion of medium 132.

Figure 13A:
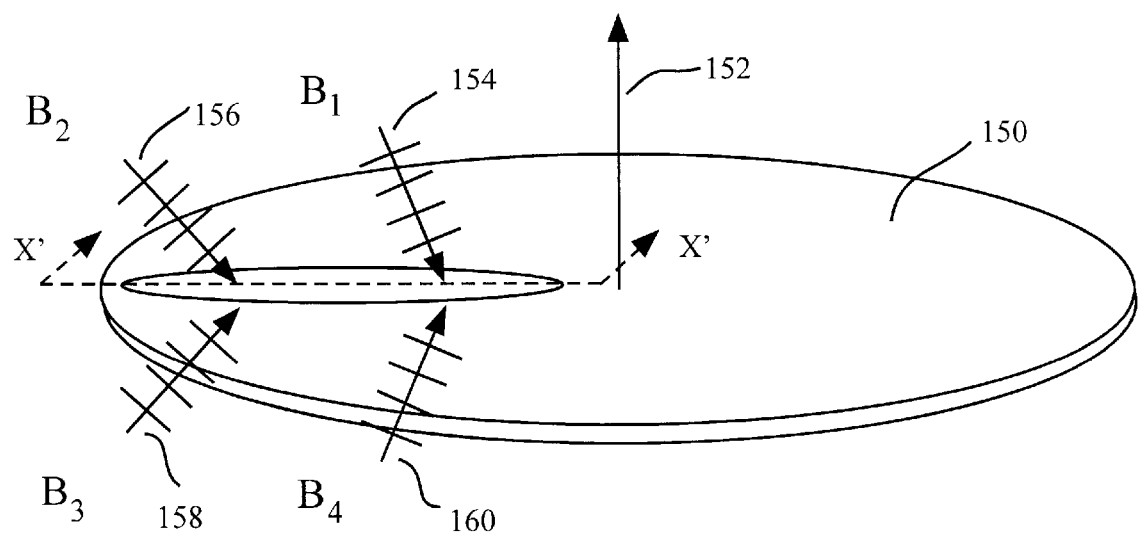
FIG. 13A is a perspective view of a rotatable photoactive medium showing an alternate method for writing the complex format gratings according to the present invention.
Figure 13B:
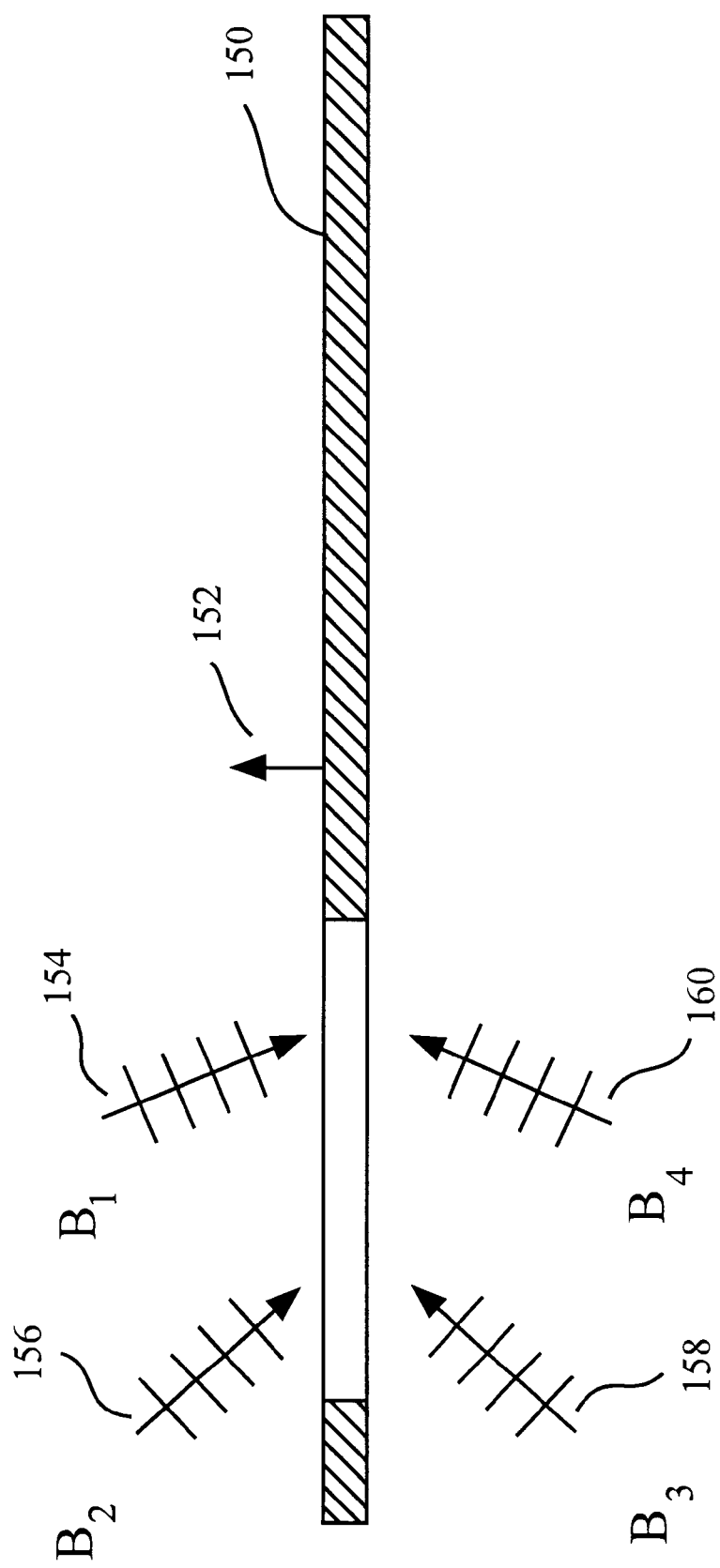
FIG. 13B is a cross-sectional view of the rotatable photoactive medium of FIG. 13A, showing the beams used for writing the complex format gratings thereon.

With reference to FIG. 13A, a perspective view of a rotatable photoactive medium 150 such as a disk, and. FIG. 13B, a cross section through the center of the disk in FIG. 13A along line X'—X', a general description of an alternative method to record format holograms on a rotatable photoactive medium 150 is described. The disk is rotated about axis 152. Beams $B_1$, $B_2$, $B_3$, and $B_4$ (at reference numerals 154, 156, 158, and 160) are focussed in one dimension onto a strip region of medium 150 using, e.g., cylindrical lenses. The medium 150 is rotated under continuous illumination, thus recording a complex format grating hologram through the angle of rotation. When the width of the illuminating region is substantially narrow, the fringes are substantially parallel to the direction of motion of the medium, so that the hologram gratings can be recorded while a medium is in motion.

As the trailing portion of the beam records over that part of the disk exposed by the leading portion, the fringes being recorded fall substantially at the same position of the fringes previously recorded. Thus, the fringes are not destroyed or substantially reduced during rotation. Furthermore, after a format hologram has been recorded, the cross section X'—X' can be generally illustrated by FIG. 9A. The technique illustrated in FIGS. 13A and 13B can also be used to record format holograms in a laterally moving medium, such as holographic tape.

Figure 14C:
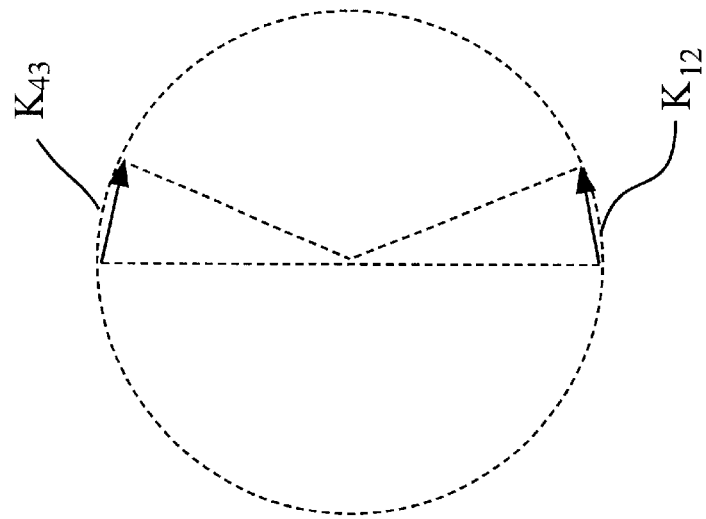
FIGS. 14A through 14C are diagrams showing a specific example of the wave vectors of the incident light beams and the resulting grating vectors that may be used for the embodiment of FIG. 11.
Figure 14B:
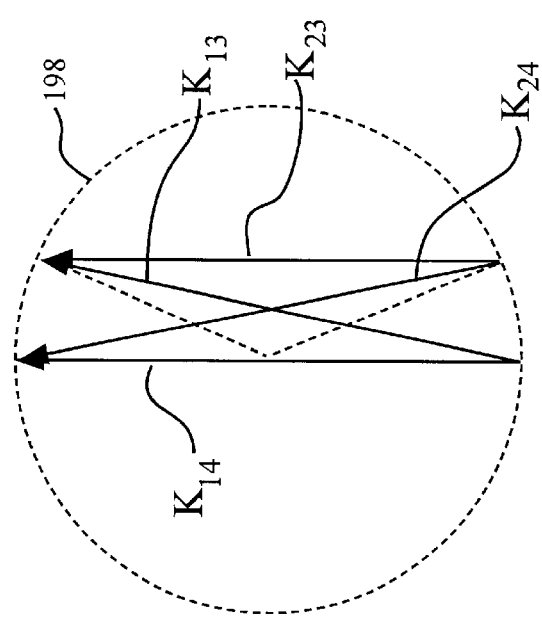
Figure 14A:
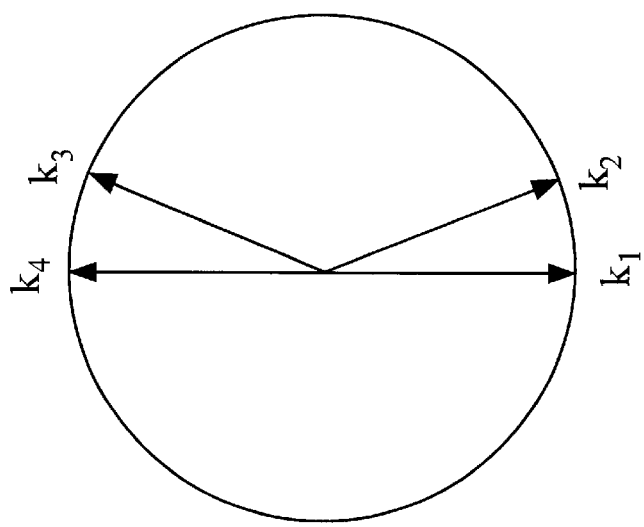

In an exemplary embodiment of the present invention, wave vectors are oriented as in FIG. 14A. As a specific example of the more general case of FIG. 7, wave vectors k1 and k4 of FIG. 14A are perpendicular to the surface of the medium. This geometry results in the reflection gratings with grating vectors $K_{14}$, $K_{24}$, $K_{13}$, and $K_{23}$ shown at reference numerals 170, 172, 174, and 176, respectively, within k-circle 178 in FIG. 14B. Transmission gratings with grating vectors $k_{43}$ and $K_{12}$, shown in FIG. 14C, generally result if all four write beams of FIG. 14A are mutually coherent and simultaneously present.

Figures 15A, 15B:
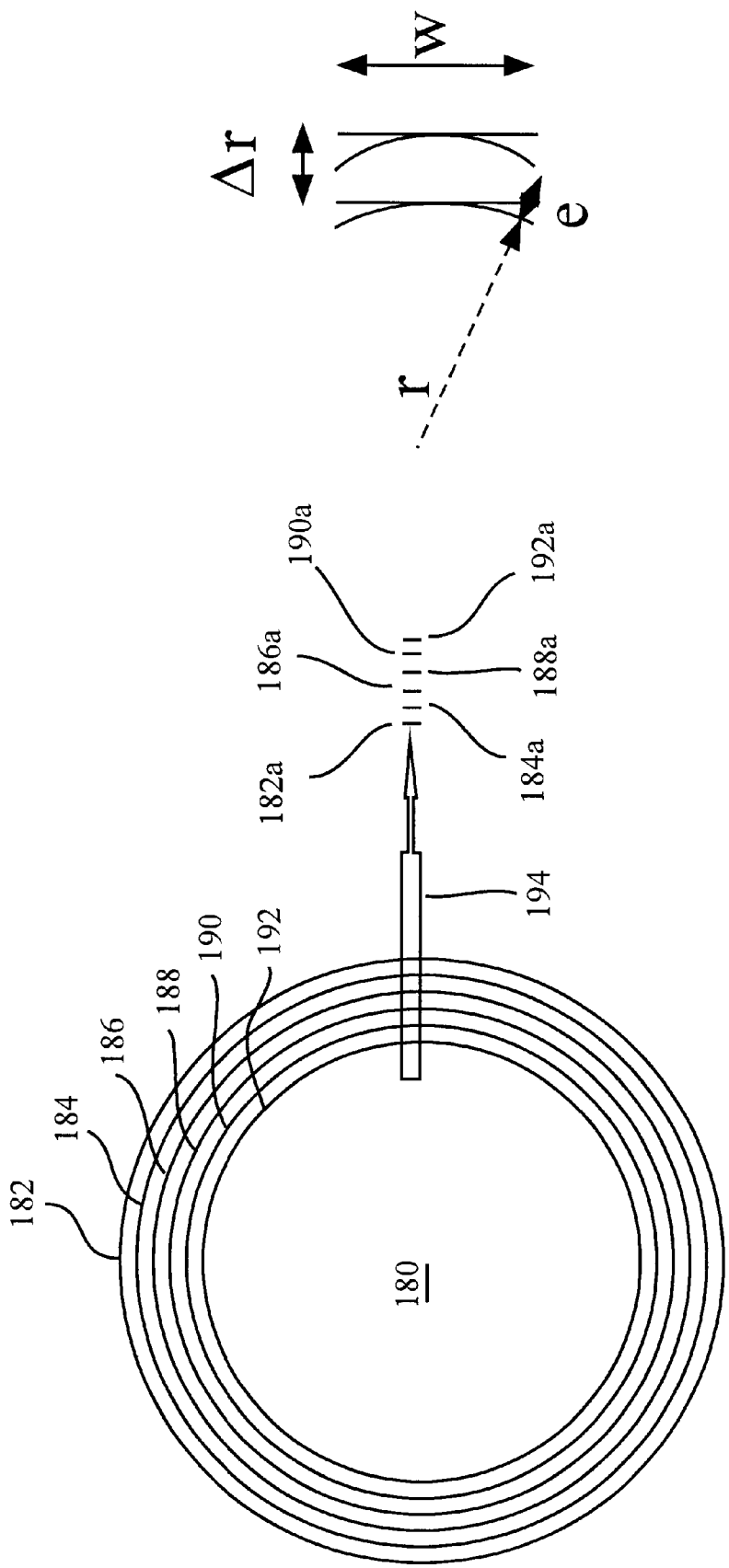
FIG. 15A is a diagram showing concentric tracks on a disk medium and a magnified view of a toroidal strip that appears to have Cartesian geometry.
FIG. 15B is a magnified view of a portion of one of the tracks of the disk in FIG. 15A.

The requirement for cylindrically symmetric wavefronts is eliminated by writing in a small region of the disk which locally appears to have Cartesian geometry. FIGS. 15A and 15B show concentric tracks and a magnified view of a strip that appears to have Cartesian geometry. FIG. 15A is a top view of a disk 180 showing several concentric tracks 182, 184, 186, 188, 190, and 192. Views of these tracks through radial section 194 yield track segments 182a, 184a, 186a, 188a, 190a, and 192a, shown to the right of radial section 194.

FIG. 15B is a magnified view of one of the track segments of the disk shown in FIG. 15A. To ensure that the fringes are substantially parallel to the direction of motion, the width of the strip is chosen such that the error, e, is much less than the radial track spacing, $\Delta r$. The error is given by: $e=-r+\text{sqrt}[(r^2)+(w/2)^2]$, where r is the radius. For example, if r=50 mm, Δr=1.56 μm, and e<<Δr, then w<<790 μm, if e<Δr/10 then w<250 μm.

Figure 16:
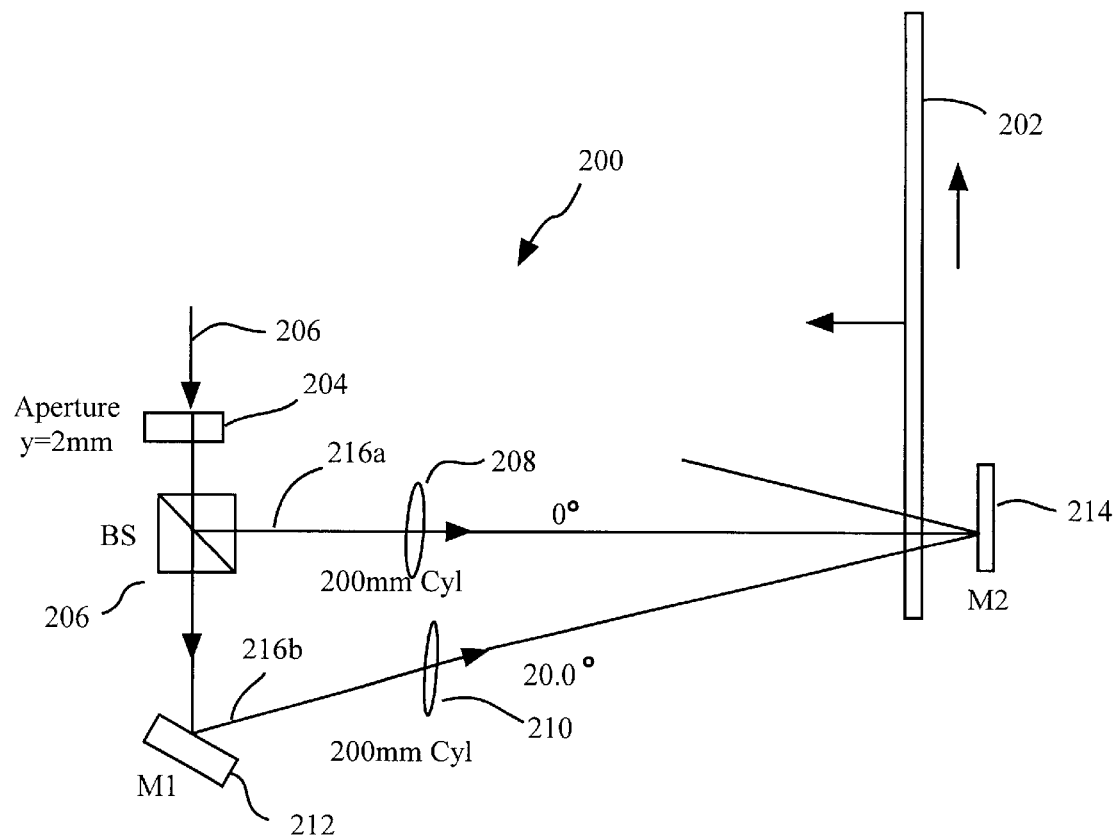
FIG. 16 is a diagram of an optical system that may be used to record a complex format grating on a circular strip of a disk medium according to the present invention.

In a preferred embodiment of the present invention, given here by way of example and not by way of limitation, optics 200 for illuminating a strip in a photoactive medium 202 according to the present invention are shown in FIG. 16. To introduce all the beams shown in FIG. 13B, the optics 200 shown in FIG. 16 are used. Optics 200 include aperture 204, beam splitter 206, cylindrical lenses 208 and 210 and first and second mirrors 212 and 214. Beam 216 is passed through aperture 204 and split into beams 216a and 216b by beam splitter 206. Beams 216a and 216b have wavelengths of 0.532 μm. Beam 216a is focussed to the interior of medium 202 by cylindrical lens 208 and beam 216b is reflected from mirror 212 and is then focussed to the interior of medium 202 by cylindrical lens 210. If, for example, aperture 204 is 2 mm, f=200 mm in cylindrical lenses 208 and 210, and λ=0.532 μm, the strip width is w=100 μm. After passing through the medium 202, the laser beams are recycled by reflecting them off a mirror 214 and the pass back through the medium 202. This geometry results in track spacing Δr of about 3.6 μm and layer spacing Δz of about 10 μm.

Generally, a photosensitive medium can be characterized by a sensitivity S, given in units of length per unit energy. For a given photoactive medium, in the middle of the dynamic range of the diffraction efficiencies that can be achieved for its holograms, the diffraction efficiency η is given as a square of the product of the sensitivity, the fluence F (which measures as incident energy per unit area), and thickness 1, i.e. η=(SF1)². For a photoactive medium with a given sensitivity, a skilled artisan would be able to utilize the present disclosure to select the beam powers and rotation speeds for the specific example given by FIG. 16 and the accompanying discussion. For example, for sensitivity of a photoactive medium on the order of about 1000 cm/J at 532 nm (which can be obtained e.g. for cationic ring-opening photopolymer systems described in U.S. Pat. No. 5,759,721 to Dhal et al. Entitled "Holographic Medium and Process for Use Thereof" and by D. A. Waldman et al. In "Volume Shrinkage in Slant Fringe Gratings of a Cationic Ring-Opening Holographic Recording Material, Journal of Imaging Science and Technology, Vol. 41, pp. 497–514), suitable complex format gratings can be recorded when the power of each beam is about 0.5 mW, the complex format grating annulus of 1 cm width is central about a radius of about 45 mm, and the disk rotates for a single revolution at about 0.2 rpm.

FIG. 16 may be interpreted as an ideal two-dimensional optical system in which the k-circle 178 of FIG. 14B applies. This ideal two-dimensional plane contains both the spindle rotation axis and the incident laser beams. The out-of-plane angular deviation of the laser beams (at the strip) must be substantially smaller than about λ/2w so that the reflection gratings do not wash out. After reflecting off the mirror 214, the beams must also remain within this angular tolerance, and hence the mirror itself must be within this angular tolerance. In one embodiment, the disk must be rotated through precisely one revolution while illuminating the strip to write a complete track. In another embodiment, the disk is rotated for more than one revolution to improve the stitching between the intitial and final points of writing.

Figure 17:
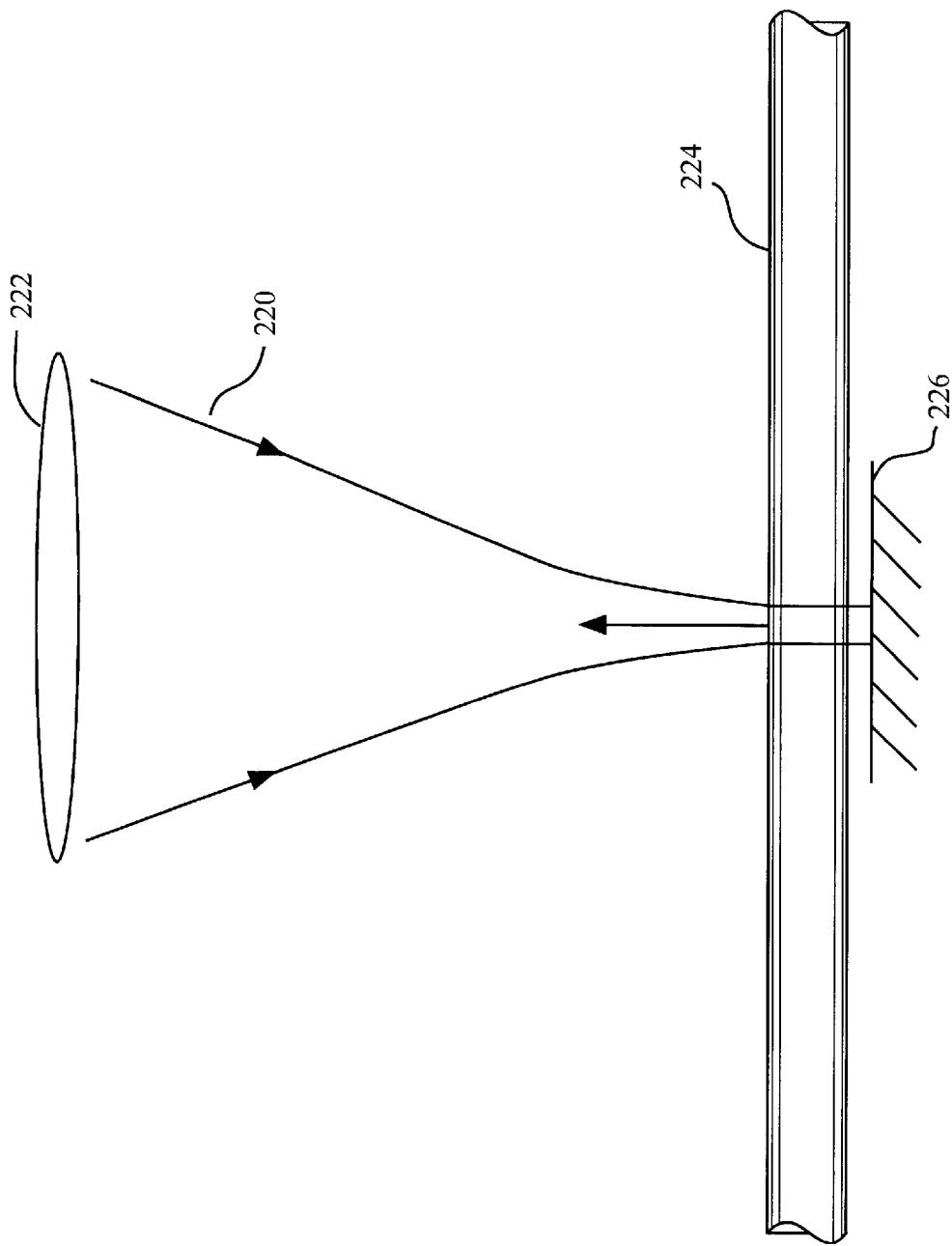
FIG. 17 is a diagram illustrating the longer minimum depth of focus required when using a cylindrical lens to pass a beam through the medium to be reflected off a surface according to the present invention.

Referring now to FIG. 17, when a cylindrical beam 220 formed by passing a beam through cylindrical lens 222 passes through the medium 224 to be reflected off a surface 226, a longer minimum depth of focus is required. A skill artisan will know how to select the appropriate optics to generate the desired depth of focus and beam width. The depth of focus must be long enough so that the incident and reflected portions of the beam pass through the medium within the depth of focus.

Holographic storage materials suitable for use in the present invention include photopolymers, and, in particular, cationic ring-opening photopolymer systems such as those described in U.S. Pat. No. 5,759,721 to Dhal et al. entitled "Holographic Medium and Process for Use Thereof," and D. A. Waldman et al., "Volume Shrinkage in Slant Fringe Gratings of a Cationic Ring-Opening Holographic Recording Material," Journal of Imaging Science and Technology, Vol. 41, pp. 497–514. These photopolymers generally shrink about 0.5% between exposure and the final cured form. Because of this shrinkage, final grating vectors have a z-component about 1.005 times longer than the grating vectors originally written in the material.

Figure 18:
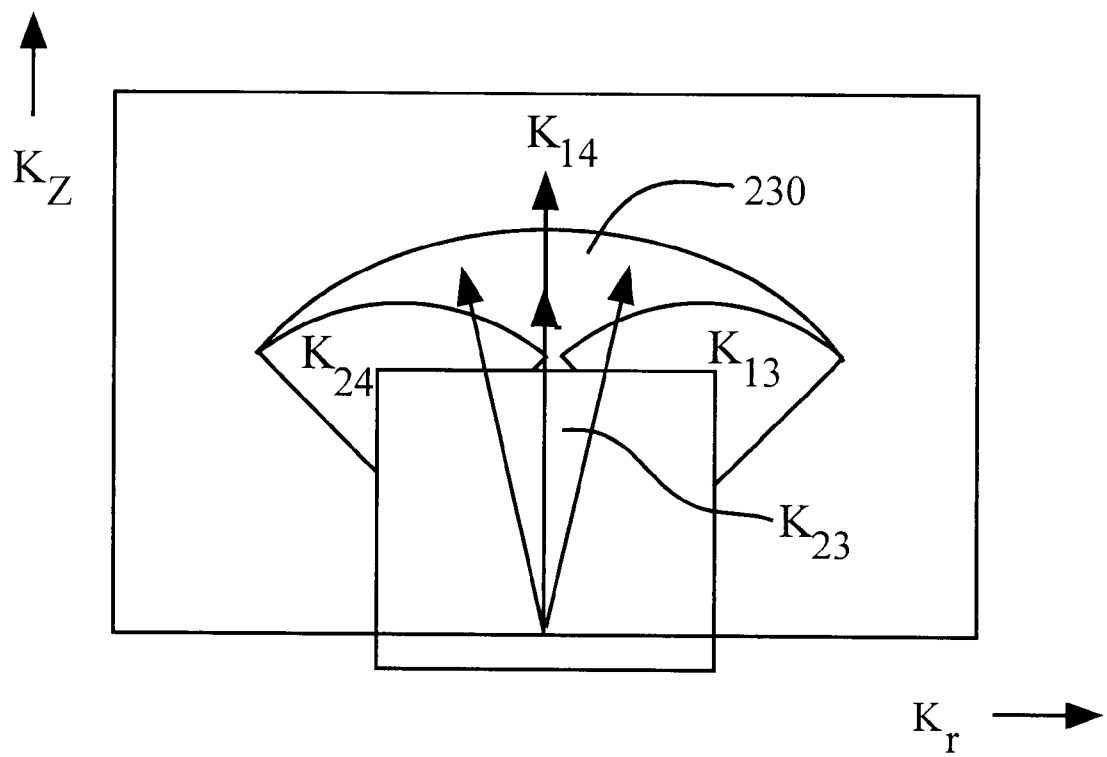
FIG. 18 is a diagram showing the range of spatial frequencies visible through a confocal optical head such as would be used to access a tube or track in a photoactive media according to the present invention.

Once a complex format hologram has been recorded in a disk, it may be examined using 0.532 μm laser illumination through a confocal microscope having a numerical aperture of 0.5. This type of confocal microscope can image only certain spatial frequency components of the disk. The spatial frequency content of the image formed by the confocal microscope equals the spatial frequencies of component gratings of the object times the coherent transfer function. The domain of the coherent transfer function is the shaded "umbrella" shaped region 230 in FIG. 18, which represents the range of spatial frequencies visible through a confocal optical head such as would be used to access a tube or track in a photoactive media according to the present invention. In FIG. 18, Kr and Kz are the radial and axial spatial frequency axes. The coherent transfer function for an ideal confocal microscope consists of a passband (shaded), where spatial frequencies are transmitted, and the exterior of this passband, where spatial frequencies are fully or substantially attenuated. Further details can be found in the textbook, Principles of Three-Dimensional Imaging in Confocal Microscopes, Min Gu, Pub. by World Scientific, Singapore, 1996. A confocal microscope can be incorporated into an optical head, as will be discussed in FIG. 24 and the accompanying description therewith.

In FIG. 18, the grating vector $K_{14}$ falls outside the domain of the coherent transfer function due to material shrinkage. Therefore, substantial reflection using 0.532 μm laser illumination through a confocal microscope having a numerical aperture of 0.5 may be obtained from gratings corresponding to grating vectors $K_{24}$, $K_{23}$, and $K_{13}$, but not from gratings corresponding to grating vector $K_{14}$.

Although the wavelength used to write holograms in this example is 0.532 μm, a wide range of wavelengths may be used according to the sensitivity of a particular holographic material. This range includes wavelengths from 400 to 800 μm, which are currently of substantial interest in the field of optical storage.

Furthermore, upon review of the present disclosure, a skill artisan would know readily how to choose beams to write component gratings at one wavelength for use at another; for example, complex format gratings may be recorded using 0.532 μm light and detected using 0.658 μm light. This is advantageous because different devices are used to record complex format gratings in media than are used access data in formatted media.

Figure 19A:
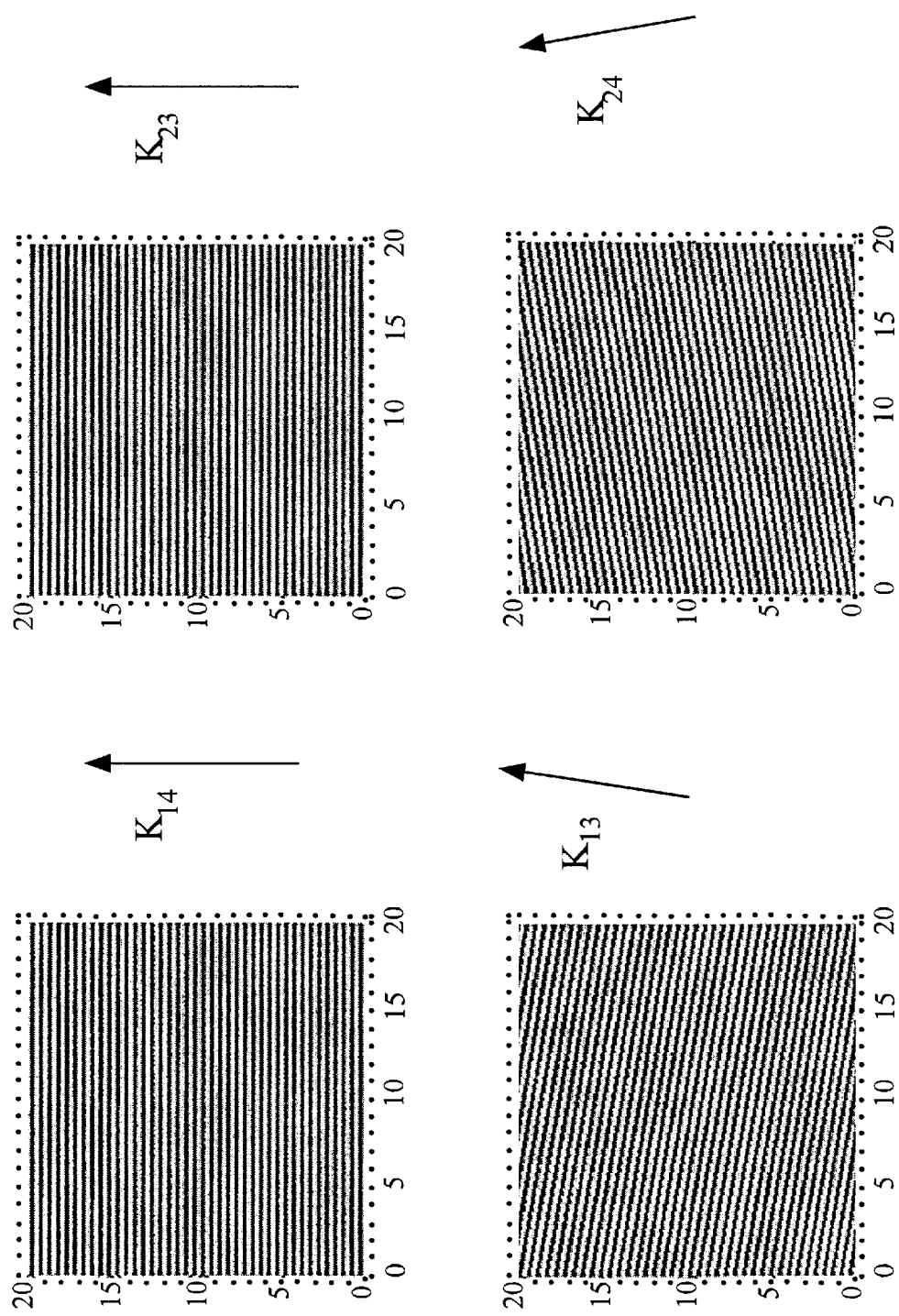
Figure 19G:
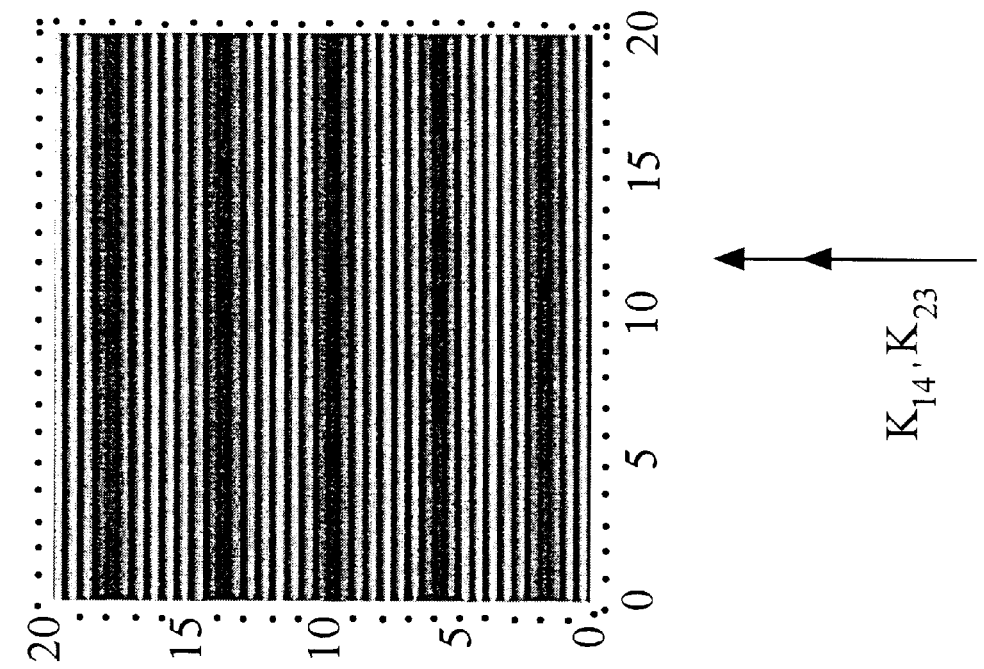
Figure 19F:
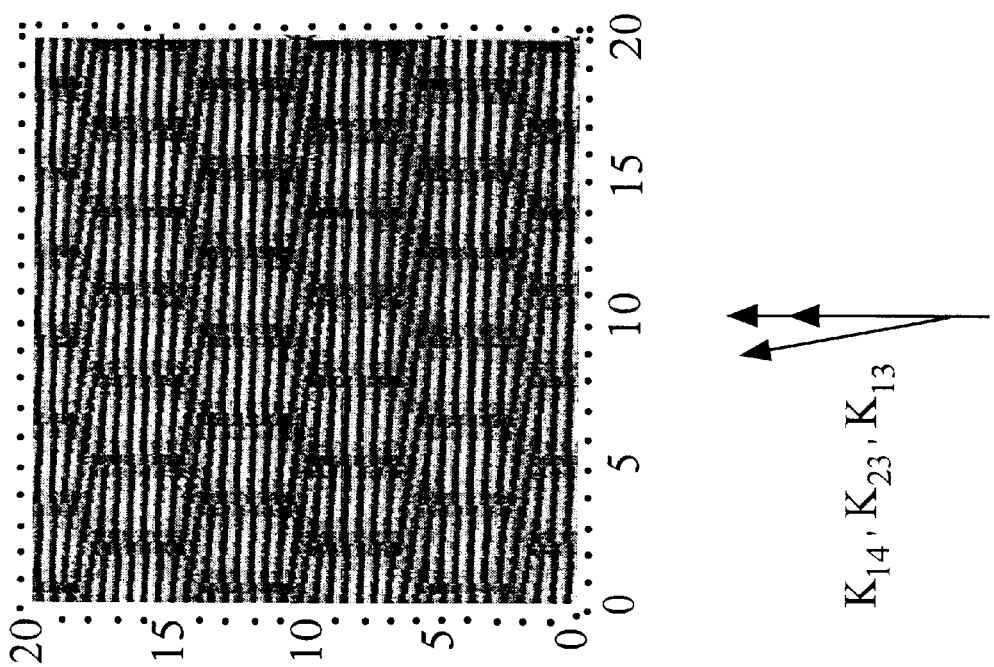
Figure 19H:
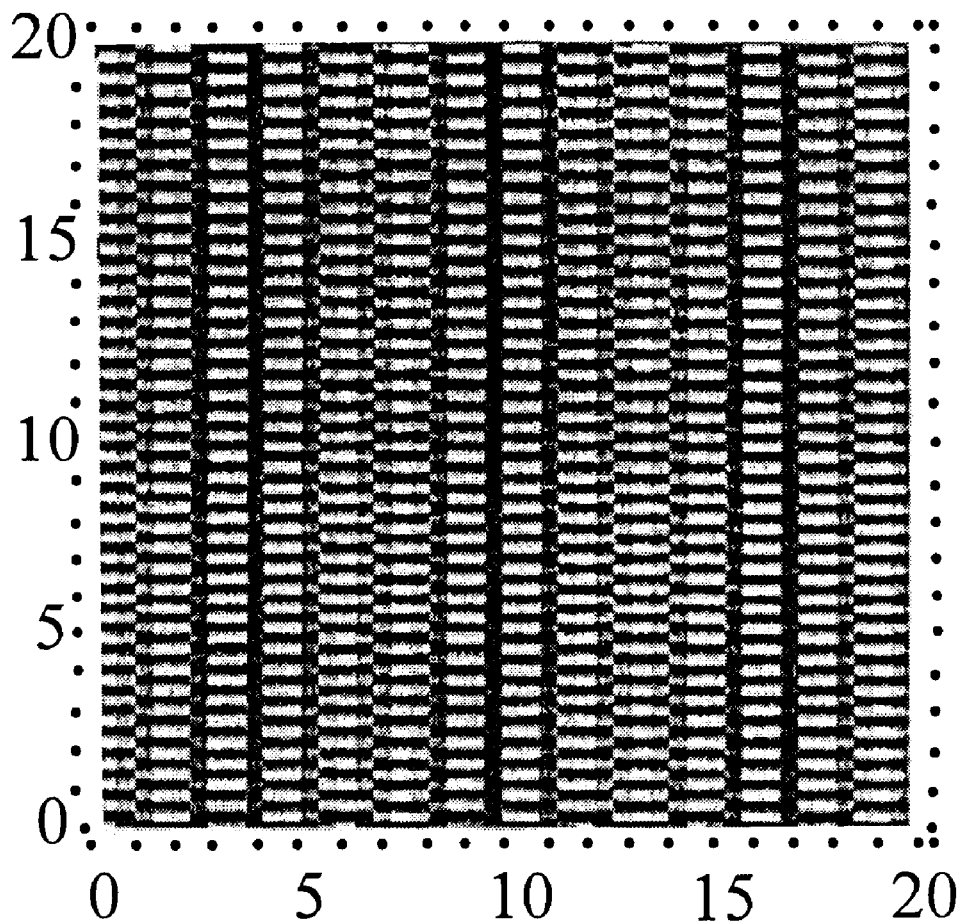

In general, a complex format grating comprising n component reflection gratings can be created using n pairs of mutually coherent plane waves. Preferably, each pair does not interact with the other pairs, so that transmission gratings are avoided. This can be accomplished e.g. by writing the component reflection gratings sequentially. FIG. 19A shows the constituent grating vectors corresponding to the grating wave vectors of 14B, namely $K_{14}$, $K_{23}$, $K_{13}$, $K_{24}$. In a Cartesian geometry, these vectors represent planar gratings, and in a cylindrical geometry, these vectors represent conical gratings. All or some of these gratings may be used to write a complex format grating. FIG. 19B shows the complex grating that results when all four gratings are present. FIG. 19C shows the complex format grating that results when the indicated grating vectors $K_{23}$, $K_{13}$, and $K_{24}$ are present. FIG. 19D shows the complex format grating that results when the indicated grating vectors $K_{14}$, $K_{13}$, and $K_{24}$ are present. FIG. 19E shows the complex format grating that results when the indicated grating vectors $K_{14}$, $K_{23}$, and $K_{24}$ are present. FIG. 19F shows the complex format grating that results when the indicated grating vectors $K_{14}$, $K_{23}$, $K_{13}$ are present. FIG. 19G shows the complex format grating for layer-only definition that results when the indicated grating vectors $K_{14}$ and $K_{23}$ are present. FIG. 19H shows the complex format grating for vertical partitioning that results when the indicated grating vectors $K_{14}$ and $K_{23}$ are present. This complex format grating may be used to produce a servo signal in only the radial direction.

Figure 20:
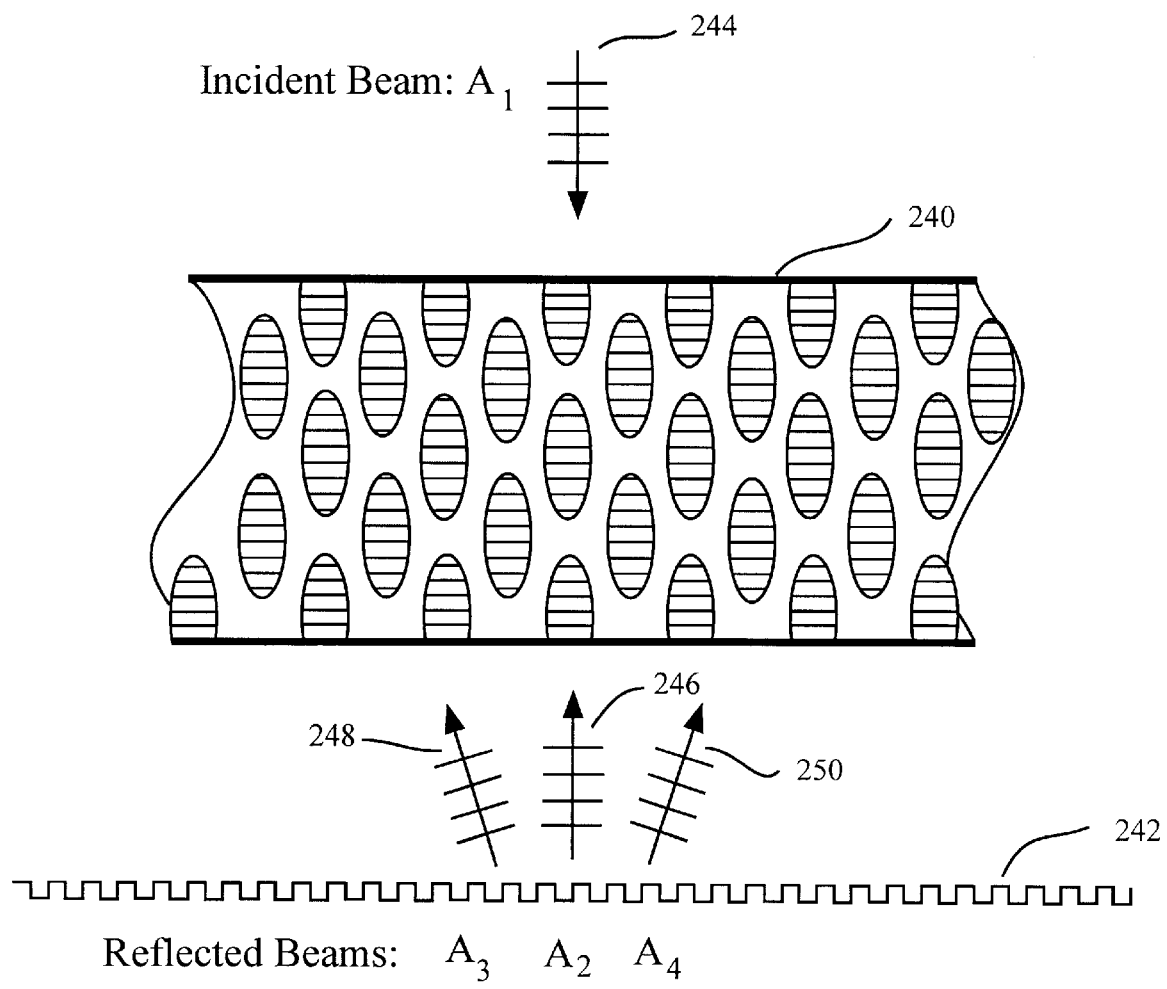
FIG. 20 is a diagram generally illustrating the use of a thin diffraction grating master for recording a complex format hologram on a photoactive medium according to the present invention.

Referring now to FIG. 20, an embodiment of the present invention is illustrated to write a complex format grating on a medium 240 by use of a surface reflection grating 242 to generate required beams with the required symmetry. Beam $A_1$ (reference numeral 244) is incident on the medium 240 and is transmitted therethrough to a separate surface reflection grating 242. The surface reflection grating 242 may comprise a reflecting coating on a plastic or glass surface relief structure and generates multiple reflected Beams $A_2$, $A_3$, and $A_4$ (reference numerals 246, 248, and 250, respectively). The incident and reflected beams are simultaneously present in the medium 240 to define a grating structure. The surface reflection grating 242 serves as a format hologram master. A surface reflection grating 242 can be a separate component, or can be part of the same storage device containing the active material. From the disclosure herein, persons of ordinary skill in the art will recognize that surface reflection grating 242 can be configured to record complex format grating holograms in a card arrangement (i.e. Cartesian geometry) in a single step, in a disk arrangement (i.e. axisymmetric geometry) in a single step, or in moving material by illumination with a narrow strip, as described above with reference to FIGS. 11 through 17, whose cross section corresponds to that shown in FIG. 20.

Figure 21:
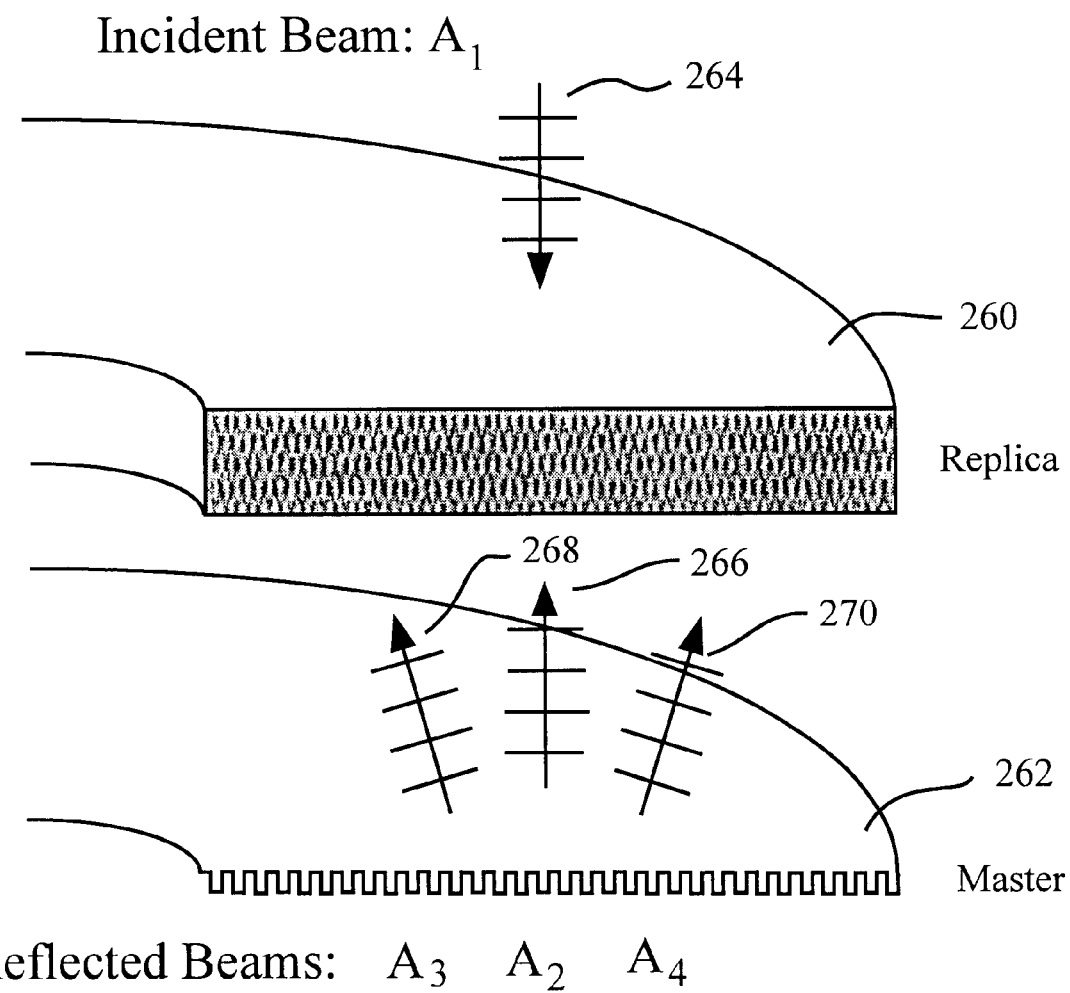
FIG. 21 is a diagram illustrating the use of a thin diffraction grating master for recording a complex format grating on a photoactive disk medium according to the present invention.

FIG. 21 illustrates an embodiment of the present invention for generating a complex format grating hologram in a disk medium 260 using a surface reflection grating 262 as a master. FIG. 23 illustrates the relationship between the disk 260, the surface reflection grating master 262 to the incident light beam path 264, and the reflected light beam paths 266, 268, and 270. If the complex format grating of the present invention is generated using a thin reflection grating as a master as shown in FIG. 21, transmission hologram gratings will generally result. These transmission hologram gratings may be minimized in materials whose hologram strength falls off substantially with decreasing grating frequency. Persons of ordinary skill in the art selecting materials to use as media in the present invention may consider this property as desirable.

Referring now to the vector diagrams of FIGS. 22A through 22D, it may be seen that Beams $A_1$, $A_2$, $A_3$, and $A_4$ of FIGS. 20 and 21 have wave vectors $k_1$, $k_2$, $k_3$, and $k_4$, (at reference numerals 272, 274, 276, and 278, respectively).

Figure 22B:
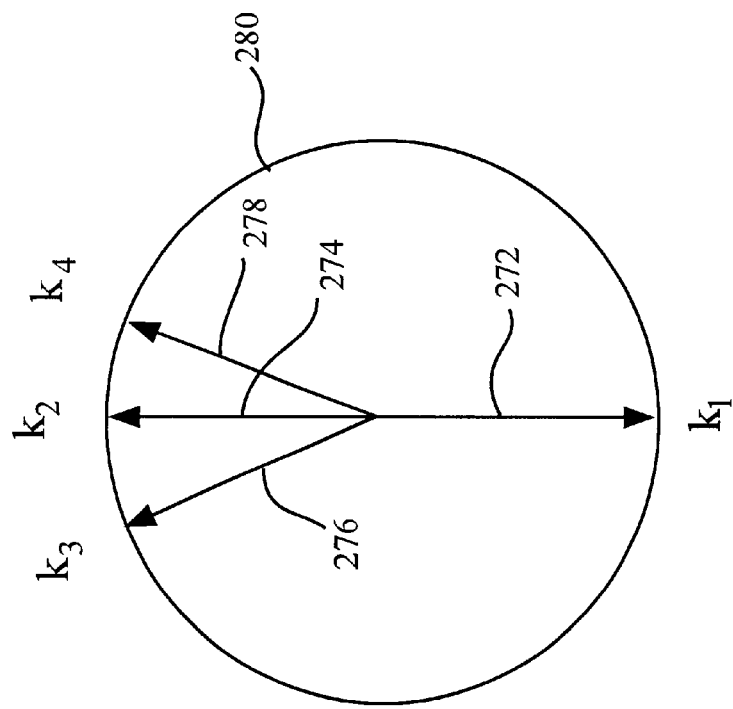
FIGS. 22A through 22D are vector diagrams representing the writing beams and the resulting complex format grating for the embodiment shown in FIG. 20.
Figure 22A:
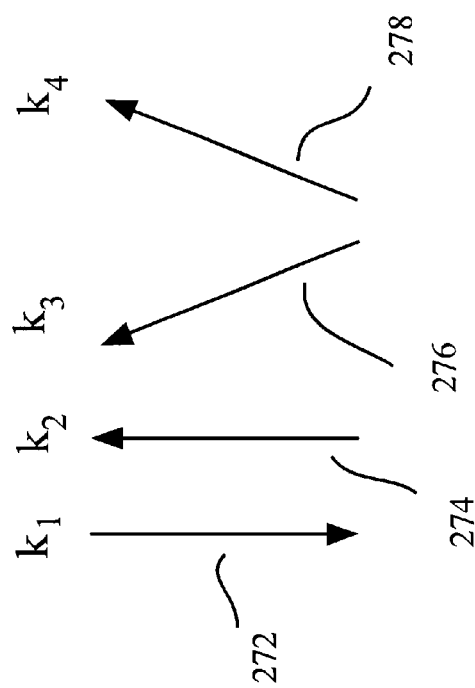

FIG. 22A illustrates the wave vectors separately, and FIG. 24B illustrates the wave vectors 272, 274, 276, and 278 orientated with respect to a Bragg sphere 280.

Figure 22D:
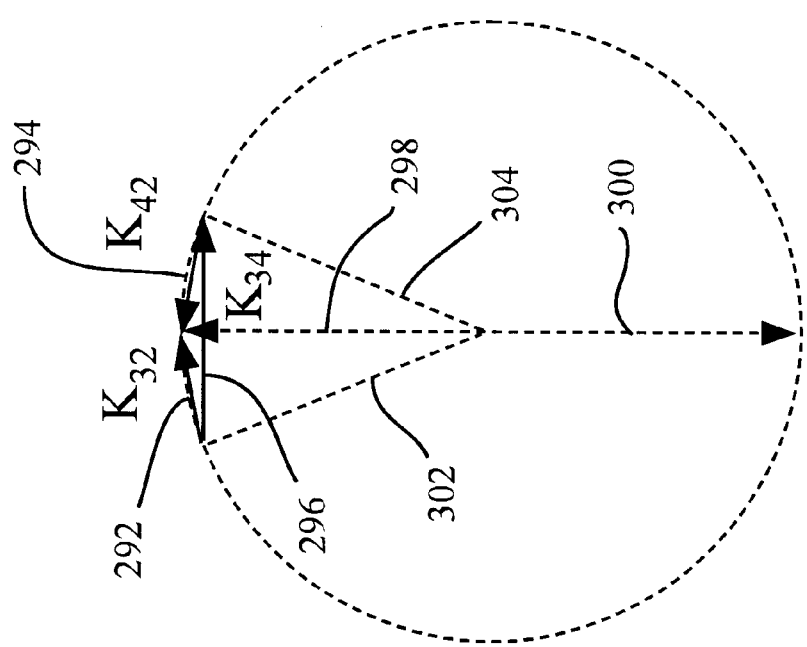
Figure 22C:
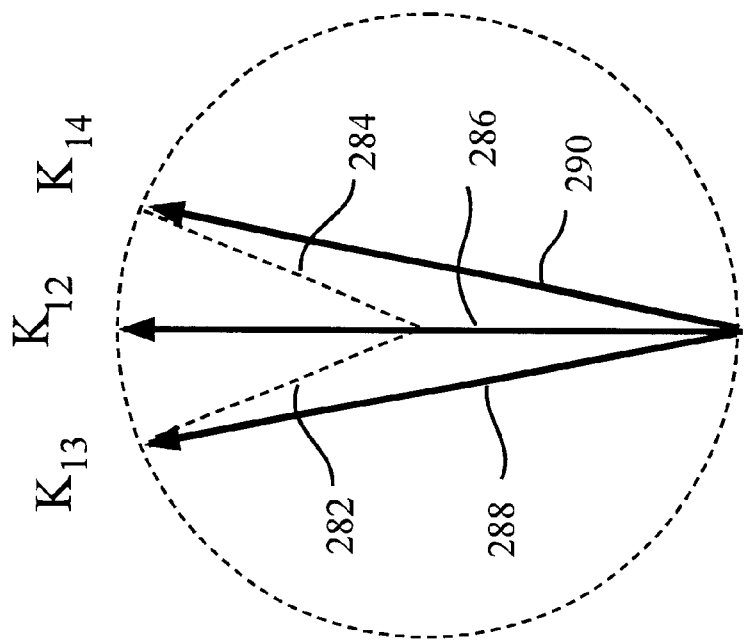

FIG. 22C illustrates three grating vectors for constituent hologram gratings that generally result from beam combinations $(A_1, A_2)$, $(A_1, A_3)$, and $(A_1, A_4)$: $K_{12}=k_2-k_1$, $K_{13}=k_3-k_1$, and $K_{14}=k_4 k_1$. The dashed lines 282 and 284 in FIG. 22C represent the wave vectors 276 and 278 of FIG. 22B. The grating vectors 286, 288, and 290 shown in FIG. 22C represent reflection hologram gratings.

FIG. 22D illustrates three grating vectors 292, 294, and 296 for constituent hologram gratings that generally result from beam combinations $(A_3, A_2)$, $(A_4, A_2)$: $K_{32}=k_2-k_3$, $K_{42}=k_2-k_4$, respectively. The four dashed lines 298, 300, 302 and 304 represent the wave vectors of FIG. 24B. These wave vectors represent transmission hologram gratings.

Thus, the wave vectors and grating vectors depicted in FIGS. 22A through 22D are two-dimensional projections of the local wave vectors and grating vectors in the plane of the cross section. For linear tubes in, for example, card or tape media, the vectors are projections on a two-dimensional Cartesian coordinate system. For circular tubes in e.g. disk media, the vectors are projections on the radial and axial coordinate subsystem of a cylindrical coordinate system. For this arrangement in FIGS. 20 and 21, the focussed readout beam must generally be a wavelength substantially comparable to the wavelength of the recording beams.

Referring now to FIGS. 23A and 23B, the relationships between a photoactive disk medium 310 and the wavefronts of four writing beams are depicted. FIG. 23A is a perspective view of a disk medium 310 having rotational axis shown at arrow 312. FIG. 23A shows the wavefronts of the conical waves that result for beams $A_3$ and $A_4$ (at reference numerals 314-1, 314-2 and 316-1 and 316-2, respectively) and the wavefronts of the plain waves that result for beams $A_1$ and $A_2$ (at reference numerals 318-1 and 318-2 and 320-1 and 320-2, respectively) oriented normal to the surface of the disk 310. Persons of ordinary skill in the art will note that the beams having the same reference numerals with the -1 and -2 suffixes are symmetrical about rotational axis 312.

FIG. 23B is a composite of three cross sectional views of the disk medium 310 of FIG. 23A across a diameter thereof and illustrates the beam pairs that form component reflection gratings. The dashed lines 312 in the segments of FIG. 23B represents its rotational axis 312 in FIG. 23B as did the arrow 312 in FIG. 23A. As may be seen from an examination of FIG. 23B, a first component grating is formed by beam pair 318 and 320, a second component grating is formed by beam pair 318 and 314, and a third component grating is formed by beam pair 318 and 316.

Generally, storing the format hologram, which requires maintaining mutual coherence between pairs of light beams, can be performed in controlled conditions in a factory environment. Data storage and retrieval can then be performed in a user environment using a relatively simple and robust optical storage system. Storage or retrieval can be performed using a single light beam incident on the medium, and using a single optical head.

A general optical head 330 is illustrated in FIG. 24A, positioned to access a storage device 332 comprising a photoactive medium 332. Optical head 330 is used for both reading from and writing to the medium 332. Optical head 330 allows for a fixed laser source. Medium 332 has had a tubular complex format grating written into it according to the methods of the present invention as may seen in its interior 334. The photoactive medium 332 may be disposed between two cover layers 334 (e.g. glass) for stability and protection from the environment. The output of optical head 332 is optically coupled to laser and detector optics 338 using reflecting surface 340.

Referring to FIG. 24B, it may be seen that laser and detector optics 338 includes a confocal detector to discriminate light reflected from a desired layer. Laser illumination 342 from laser 344 for the access wavelength (e.g. 532 nm) is expanded and directed toward the medium by lenses 346 and 348. The expanded beam 350 passes through a beam splitter 352, which is present to couple the incident beam into the access path. One objective lens 354 in optical head 332 focuses the access beam onto the medium. A dynamic spherical aberration corrector (SAC) 356 is optionally present in the path of the beam to correct for variations in spherical aberration that arise as different depths are accessed in the medium. Depending on the type of spherical aberration corrector used, it may be located before or after the objective lens. (See e.g. U.S. patent application Ser. No. 09/109,111 (OPTK-001) filed on Jul. 2, 1998, by mark E. McDonald and Yu Chuan Lee; U.S. Pat. No. 5,202,875, issued Apr. 13, 1993 to Rosen et al., and U.S. Pat. No. 5,157,555, issued Oct. 20, 1992, to Reno.) Light is focussed with a numerical aperture in the range of, for example, 0.4 to 0.65 or higher. Thus, spot sizes used to access data are on the order of 1 $\mu m^2$.

The light is reflected from the accessed point in the medium 334. To access data residing along a tube of the present invention, the optical head is focussed to the center of the tube, where the reflection is highest. Data may be recorded by, e.g., selective localized alteration of the complex format hologram grating defining the tube. Data are represented according to variations in the reflected signal. Generally, a wide range of readout powers can be used, provided that they are high enough to return a reflected signal strong enough to be detected, but not so high that they substantially affect the data storage medium. Typically readout powers of about 10–20 mW are desired. Generally, the recording powers will vary widely according to the properties of the storage medium, and typical recording powers of in the range of about 25 mW to 1 W are desired.

Reflected light is returned through spherical aberration corrector 356 and the objective lens 354. Reflected light passes through the beam splitter 352 towards the detector 360. A first lens 362 focuses the light to a point of focus. A pinhole 364 is situated to admit the focused light corresponding to the accessed layer; a pinhole situated in this manner is the well-known basis for confocal detection. A second lens 366 collimates the light, which is then detected by detector 360.

Persons of ordinary skill in the art having the benefit of the present disclosure will appreciate that the exemplary head can be modified to improve its efficiency. For example, a quarter wave plate 368 inserted between a polarizing beam splitter and the material will cause substantially all of the returning light to be deflected to the detector 360. Further details can be seen upon examination of co-pending commonly assigned patent application, Ser. No. 09/016,382, filed by Hesselink et al. on Jan. 30, 1998, and references cited therein. In the case of a rotatable media such as a disk, rotation brings different regions of the medium into the range accessible to the optical head. The head can be moved radially to access different tracks in the radial direction, and in depth to access different layers of tubes by use of well known positioning techniques.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed:

1. A photoactive medium having a complex format grating written thereon, said complex format grating including at least three component gratings, each of said component gratings characterized by a unique grating vector, said complex format grating defining a plurality of tracks, at least one of said tracks comprising a localized alteration in said format grating, said localized alteration representing a stored data bit.

2. The photoactive medium of claim 1 wherein each said unique grating vector corresponds to a planar grating.

3. The photoactive medium of claim 1 wherein each said unique grating vector corresponds to a conical grating.

4. The photoactive medium of claim 1 wherein at least one said unique grating vector corresponds to a planar grating and at least one other said unique grating corresponds to a conical grating.

5. A method for optical data storage, comprising:
providing a photoactive medium;
focussing a plurality of pairs of mutually coherent light beams into a focal plane in said medium;
forming a complex format grating hologram in said photoactive medium according to said plurality of pairs of mutually coherent light beams, said complex format grating hologram defining a plurality of tracks, said tracks configured for recording data therein; and
recording a data bit in the form of a localized alteration in said format grating.

6. The method of claim 5 wherein said focussing a plurality of pairs of mutually coherent light beams into a focal plane in said medium comprises focussing two pairs of beams into said focal plane in said medium.

7. The method of claim 5 wherein said focussing a plurality of pairs of mutually coherent light beams into a focal plane in said medium comprises focussing three pairs of beams into said focal plane in said medium.

8. A method for optical data storage, comprising:
providing a photoactive medium;
focussing a plurality of pairs of mutually coherent light beams into a focal plane in said medium;
forming a complex format grating hologram in said photoactive medium according to said plurality of of pairs of mutually coherent light beams, said complex format grating hologram defining a plurality of tracks, said tracks configured for recording data therein;
recording a data bit in the form of a localized alteration in said format grating; and
moving said medium in a linear direction while said plurality of pairs of mutually coherent light beams are focussed into said medium.

9. The method of claim 8 wherein said focussing a plurality of pairs of mutually coherent light beams into a focal plane in said medium comprises focussing two pairs of beams into said focal plane in said medium.

10. The method of claim 5 wherein said focussing a plurality of pairs of mutually coherent light beams into a focal plane in said medium comprises focussing three pairs of beams into said focal plane in said medium.

11. A method for optical data storage, comprising:
providing a photoactive medium;
focussing a plurality of pairs of mutually coherent light beams into a focal plane in said medium;

forming a complex format grating hologram in said photoactive medium according to said plurality of of pairs of mutually coherent light beams, said complex format grating hologram defining a plurality of tracks, said tracks configured for recording data therein;

recording a data bit in the form of a localized alteration in said format hologram; and rotating said medium about an axis while said plurality of pairs of mutually coherent light beams are focussed into said medium.

12. The method of claim 11 wherein said focussing a plurality of pairs of mutually coherent light beams into a focal plane in said medium comprises focussing two pairs of beams into said focal plane in said medium.

13. The method of claim 11 wherein said of focussing a plurality of pairs of mutually coherent light beams into a focal plane in said medium comprises focussing three pairs of beams into said focal plane in said medium.

* * * * *